(12) United States Patent
Takaishi et al.

(10) Patent No.: US 11,237,777 B2
(45) Date of Patent: Feb. 1, 2022

(54) MANAGEMENT OF POLICY-BASED PRINTING SYSTEM USING A PROXY DEVICE

(71) Applicant: KYOCERA DOCUMENT SOLUTIONS, INC., Osaka (JP)

(72) Inventors: Hiroyuki Takaishi, Walnut Creek, CA (US); Tai Yu Chen, Dublin, CA (US); Michael Ong Martin, Pacheco, CA (US); Jin Liang, Dublin, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 24 days.

(21) Appl. No.: 16/837,520

(22) Filed: Apr. 1, 2020

(65) Prior Publication Data

US 2020/0409625 A1 Dec. 31, 2020

Related U.S. Application Data

(63) Continuation-in-part of application No. 16/451,913, filed on Jun. 25, 2019, now Pat. No. 10,817,230, and a continuation-in-part of application No. 16/452,038, filed on Jun. 25, 2019, now Pat. No. 10,942,688, and a continuation-in-part of application No. 16/452,041, filed on Jun. 25, 2019, now Pat. No. 10,929,548.

(51) Int. Cl.
*G06F 3/12* (2006.01)
*G06F 21/60* (2013.01)
*H04L 29/06* (2006.01)

(52) U.S. Cl.
CPC .......... *G06F 3/1236* (2013.01); *G06F 3/1222* (2013.01); *G06F 3/1238* (2013.01); *G06F 3/1267* (2013.01); *G06F 21/608* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 7,312,886 B2 | 12/2007 | Gomi | |
| 7,367,060 B2* | 4/2008 | Someshwar | ........ H04L 63/0227 380/243 |
| 7,861,282 B2 | 12/2010 | Kakigi | |
| 8,099,758 B2* | 1/2012 | Schaefer | ............. H04L 63/0428 726/1 |
| 8,185,548 B2* | 5/2012 | Lim | ........................ H04L 63/20 707/781 |

(Continued)

*Primary Examiner* — Andrew H Lam
(74) *Attorney, Agent, or Firm* — Millen, White, Zelano & Branigan, P.C.; William Nixon

(57) ABSTRACT

A policy-based printing system is implemented to allow access to a private domain to print using a public domain. The private domain includes private servers that store documents. The public domain includes servers and a printing device. A public policy server uses a domain list and a protocol connection with a private authentication server to validate a user and identify which private domain to access. The public policy server receives requests from the printing device to process a print job of a document in the private domain. A proxy printing device is created to manage a plurality of printing devices and communicate with the public policy server. The proxy printing device corresponds to a condition within the printing devices.

8 Claims, 16 Drawing Sheets

(56) References Cited

U.S. PATENT DOCUMENTS

| | | | |
|---|---|---|---|
| 8,245,306 B2 * | 8/2012 | Gimenez | G06F 21/608 |
| | | | 726/27 |
| 9,461,820 B1 | 10/2016 | Dall | |
| 2007/0107048 A1 | 5/2007 | Halls et al. | |
| 2008/0034403 A1 * | 2/2008 | Kakigi | G06F 3/1288 |
| | | | 726/1 |
| 2014/0340717 A1 * | 11/2014 | Meiyappan | H04N 1/32534 |
| | | | 358/400 |
| 2016/0019010 A1 | 1/2016 | Nakamura et al. | |
| 2018/0285041 A1 | 10/2018 | Yasui | |

* cited by examiner

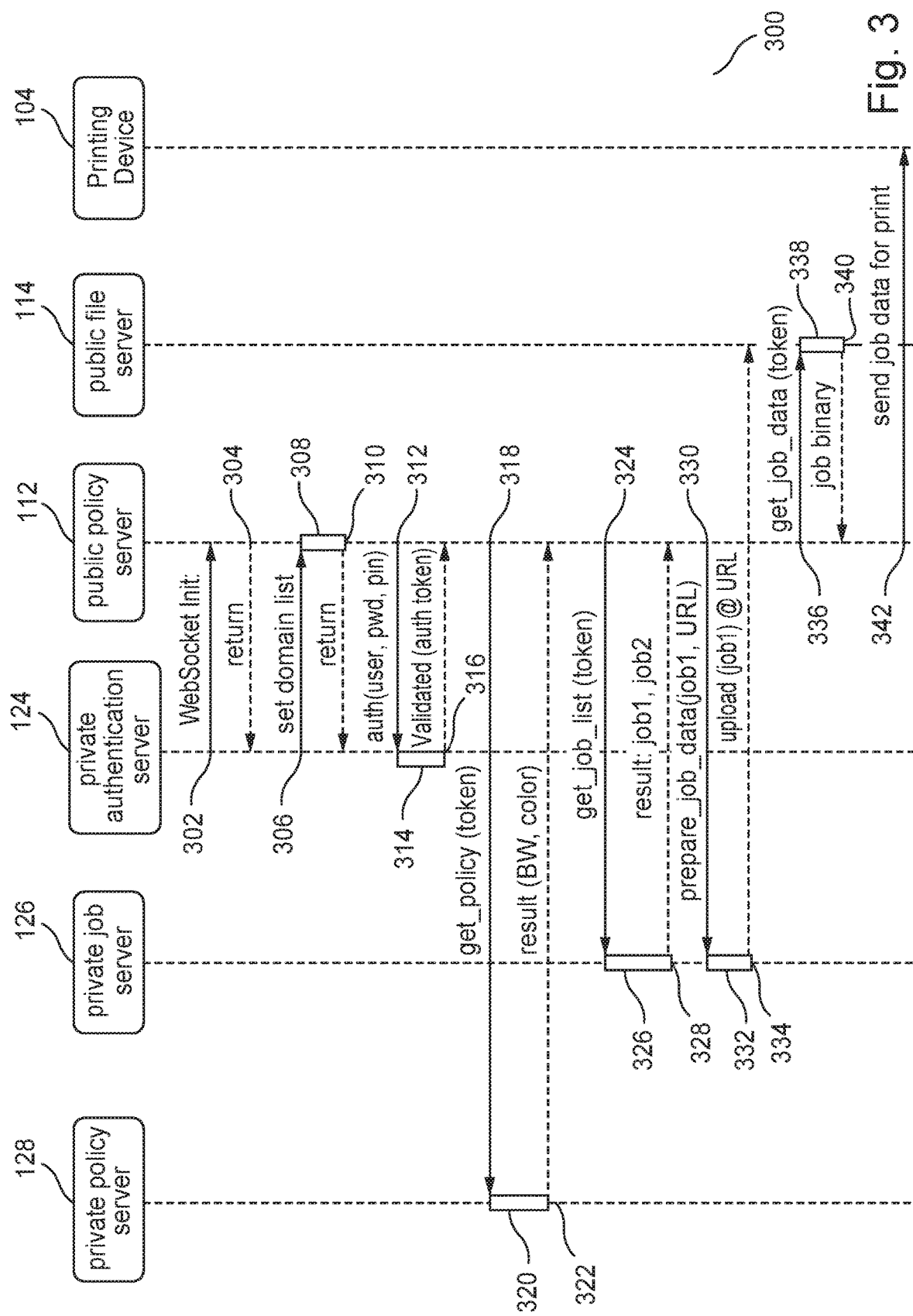

MANAGEMENT OF POLICY-BASED PRINTING SYSTEM USING A PROXY DEVICE

FIELD OF THE INVENTION

The present invention relates to a system of private and public servers that implement policy-based printing operations. The system includes a public and private network that supports the policy used for printing operations, wherein the policy is implemented using a private server in the private network interacting with a proxy printing device to manage printing devices via a public server.

DESCRIPTION OF THE RELATED ART

Existing policy-based printing systems mostly operate within a closed private domain environment. Print data submitted by users may be only accessible within a single domain environment. Some users, such as on-the-go users including insurance and real estate agents, sales executives, lawyers, and company executives, require the capability to access printing data beyond an office environment. These users travel extensively and find themselves needing to print in public locations, such as convenience stores, libraries, airports, copy and printing service stores, and the like. At these locations, the users may not reliably access the printing data. Further, these public locations may not support policy-based printing.

SUMMARY OF THE INVENTION

A system to manage a plurality of printing devices is disclosed. The system includes a public server. The system also includes a proxy printing device connected to the public server. The proxy printing device is configured to submit a request for a document and receive a response from the public server. The system also includes a first printing device of the plurality of printing devices. The first printing device has a condition corresponding to the proxy printing device. The system also includes a second printing device of the plurality of printing devices. The second printing device does not have the condition corresponding to the proxy printing device. The system also includes a private server connected to the public server and storing the document. The private server applies a policy to the request to determine whether to forward the document to the public server. The proxy printing device accepts the request if from the first printing device. The proxy printing device does not accept the request if from the second printing device.

A method is disclosed. The method includes receiving a request for a document at a proxy printing device from a first printing device of a plurality of printing devices. The method also includes determining if the first printing device includes a condition corresponding to the proxy printing device. The method also includes forwarding the request to the public server from the proxy printing device if the first printing device includes the condition. The method also includes denying the request at the proxy printing device if the first printing device does not include the condition. The method also includes determining whether to allow the request according to a policy associated with the condition as applied by a private server connected to the public server. The private server stores the document. The method also includes receiving the document at the public server from the private server if allowed by the policy.

A printing method is disclosed. The printing method includes receiving a request from a printing device at a proxy printing device to print a document stored on a private server. The printing method also includes denying the request from the printing device at the proxy printing device. The printing device does not include a condition corresponding to the proxy printing device. The printing method also includes modifying information for the printing device to include the condition. The printing method also includes updating a data file for the proxy printing device to add the printing device. The printing method also includes further receiving the request from the printing device at the proxy printing device. The printing method also includes accepting the request at the proxy printing device based on the condition of the printing device. The printing method also includes using a public server to obtain the document from the private server.

BRIEF DESCRIPTION OF THE DRAWINGS

Various other features and attendant advantages of the present invention will be more fully appreciated when considered in conjunction with the accompanying drawings.

FIG. 3 illustrates a flow diagram for implementing a policy-based printing system according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

Figure 1:
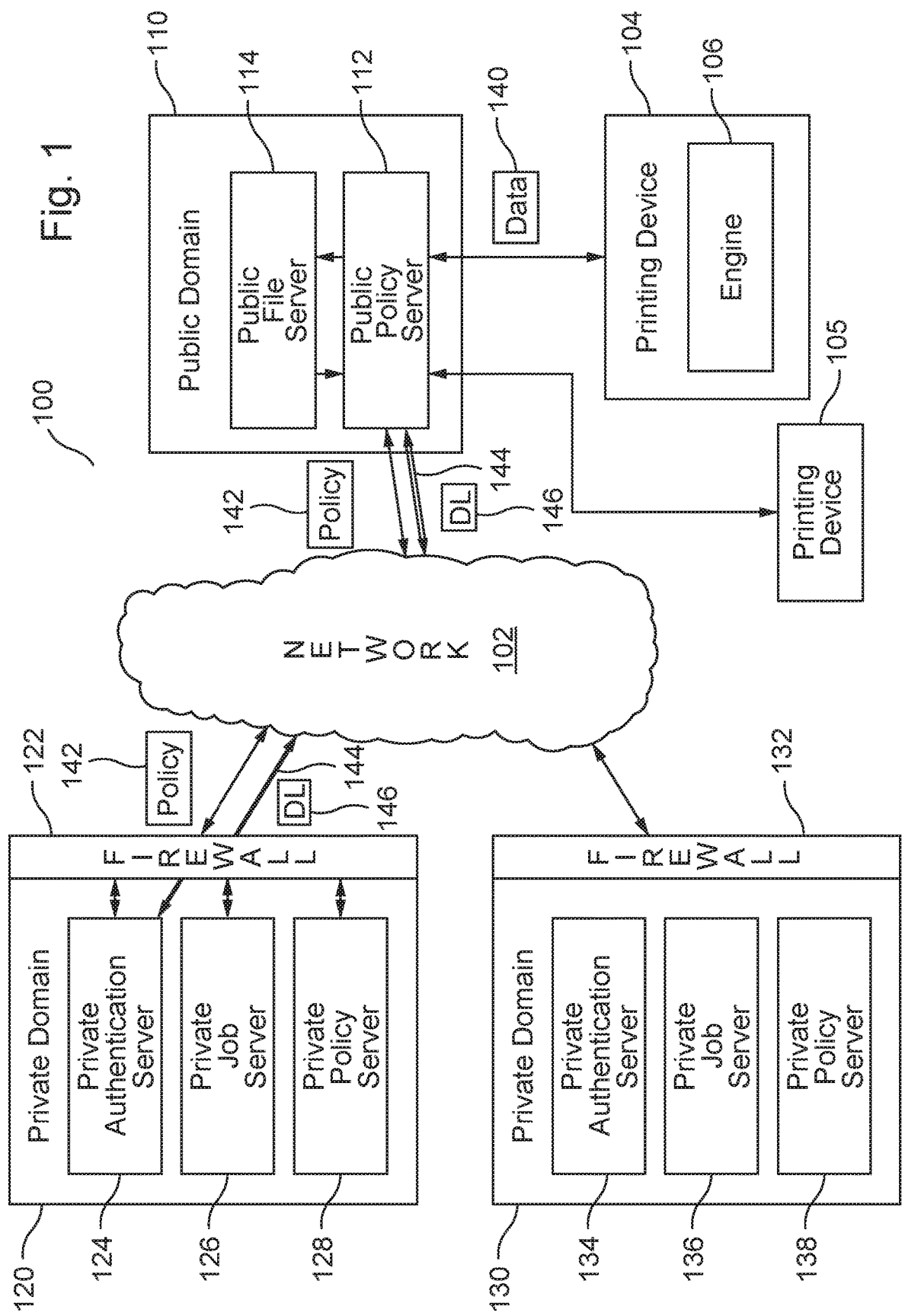
FIG. 1 depicts a system to implement policy-based printing on a printing device according to the disclosed embodiments.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers. Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 140. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identify. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112.

Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domains 120 and 130 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain to connect. That private domain will validate the user and access or use of the print job.

Figure 2:
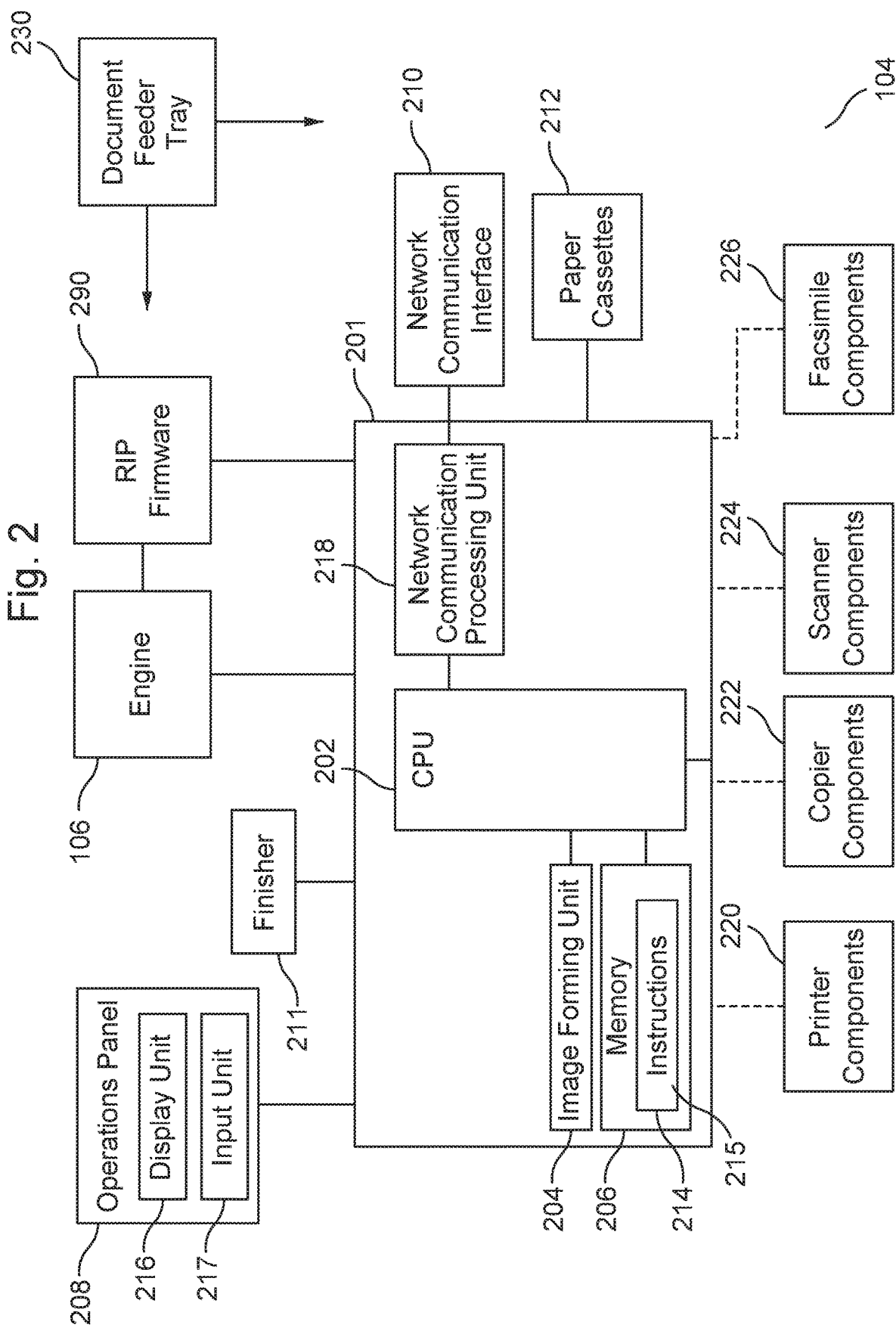
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domains 120 and 130.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers. The same operations may be executed between public domain 110 and private domain 130.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enters information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

Figure 4A:
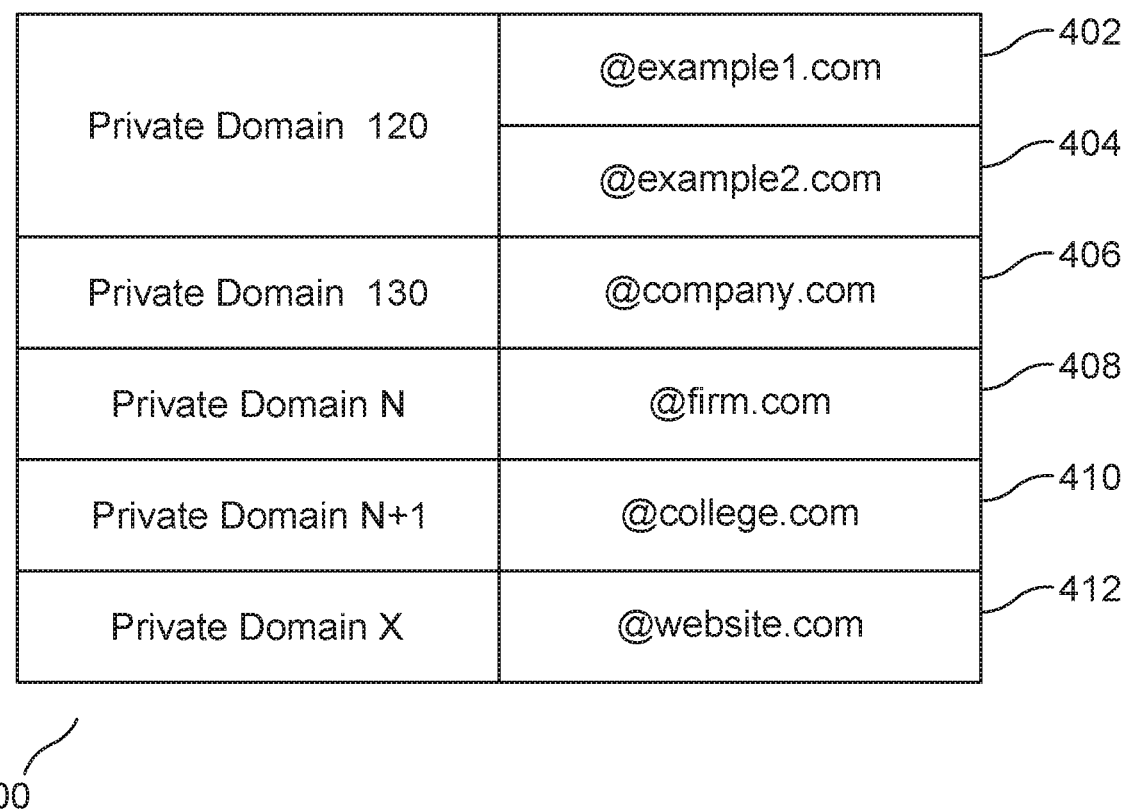
FIG. 4A illustrates a domain list for use within the policy-based printing system according to the disclosed embodiments.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Figure 4B:
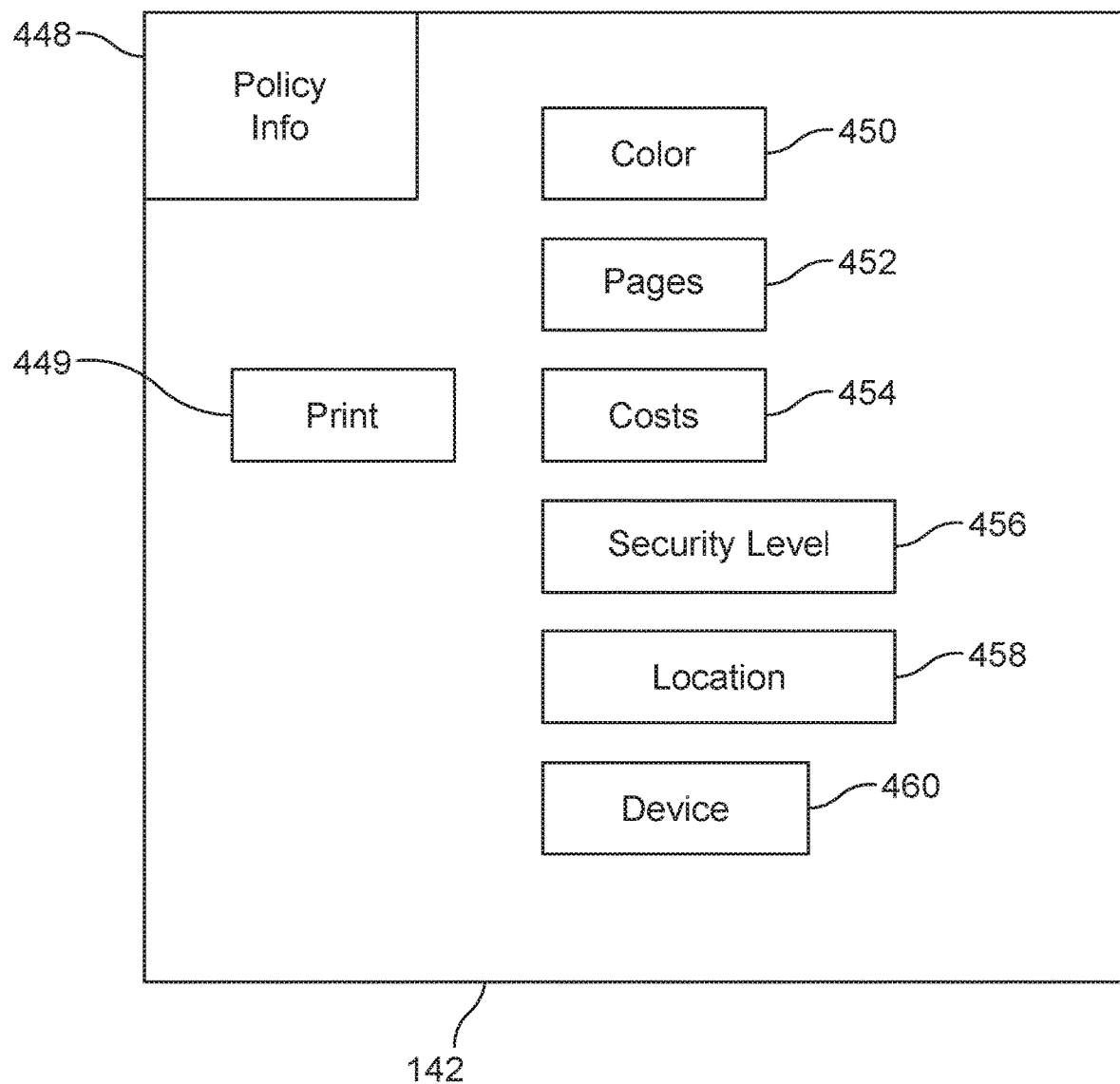
FIG. 4B illustrates a policy for use within the policy-based printing system according to the disclosed embodiments.
Figure 5:
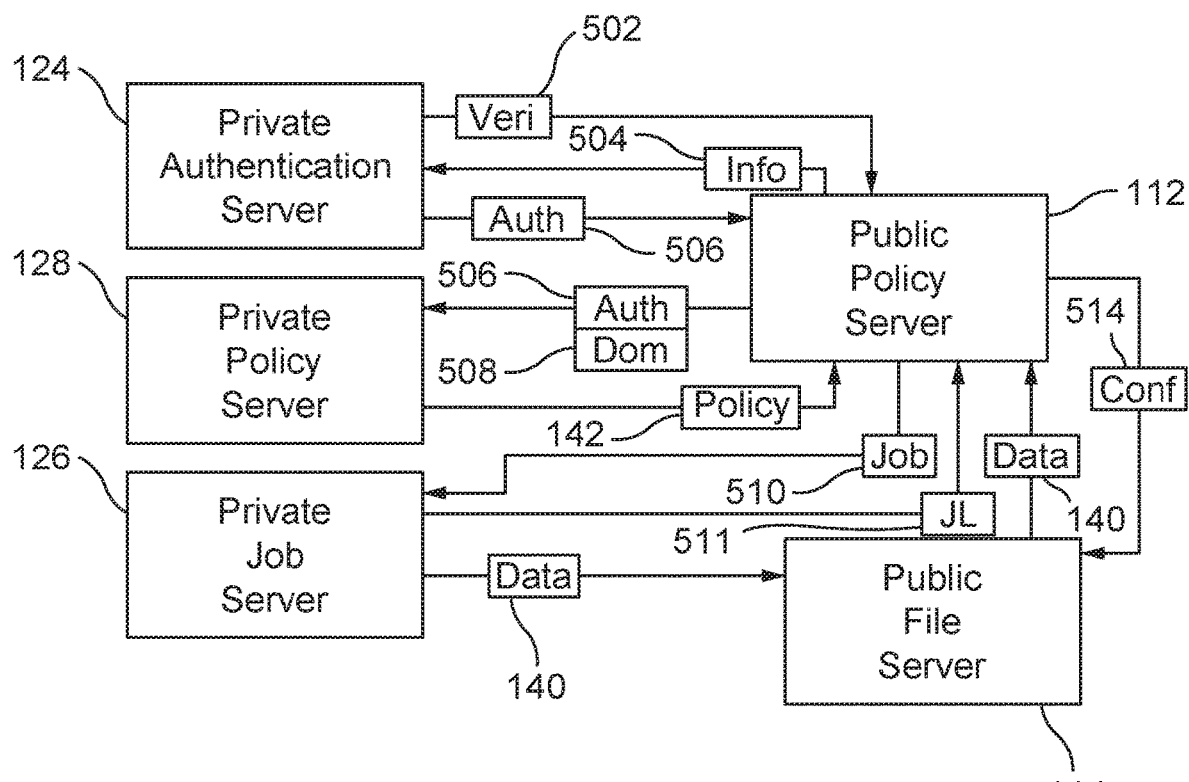
FIG. 5 illustrates a block diagram of servers and data used within the policy-based printing system according to the disclosed embodiments.

Action 320 executes by identifying policy 142 as being applicable to the user based on domain 508. Authentication token 506 may be associated with the user and this information provided from private authentication server 124. Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 146. Job list 511 includes those print jobs that meet the specifications of policy 146. For example, color print jobs will not be included in job list 511 of policy 146 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
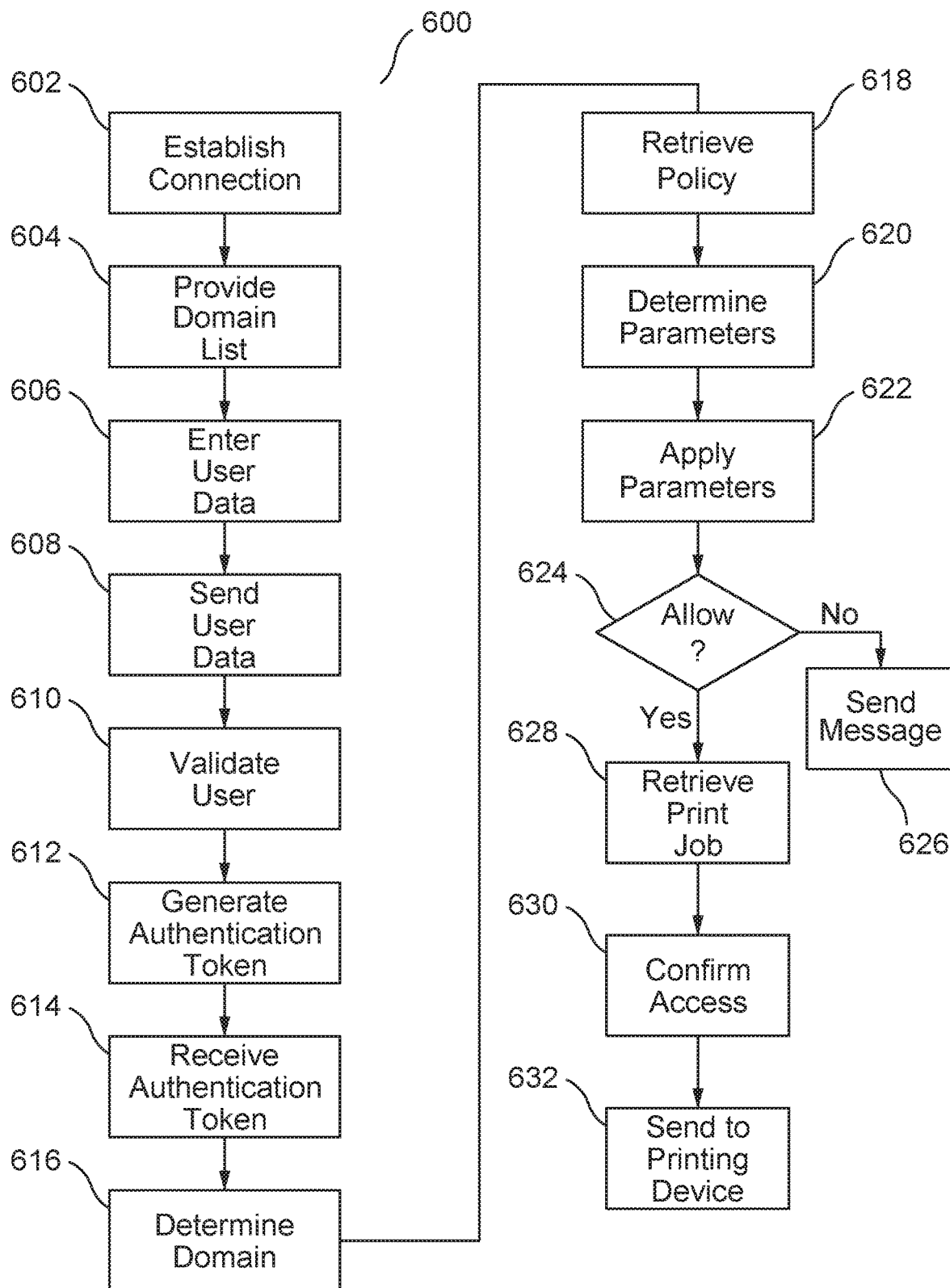
FIG. 6 illustrates a flowchart for printing at a printing device within the policy-based printing system according to the disclosed embodiments.

FIG. 6 illustrates a flowchart 600 for printing at printing device 104 within policy-based printing system 100 according to the disclosed embodiments. Flowchart 600 may refer back to elements disclosed in FIGS. 1-5 for illustrative purposes. The embodiments disclosed by flowchart 600, however, are not limited to the features disclosed in FIGS. 1-5. Further, flowchart 600 may compliment the embodiments disclosed by flow diagram 300.

Step 602 executes by establishing a protocol connection 144 between private authentication server 124 and public policy server 112. The protocol connection allows communication between the servers, one in private domain 120 and another one in public domain 110. Step 604 executes by providing a domain list 146 from private authentication server 124 to public policy server 112. Domain list 146 may include applicable private domains and associated email domains that are accessible by public policy server 112. Step 606 executes by entering user data 504 within public network 110 and providing the data to public policy server 112. Step 608 executes by sending user data 504 to private authentication server 124.

Step 610 executes by validating the user at private authentication server 124. Private authentication server 124 checks the provided user data 504 against its stored authentication records for the user. If the user is validated, then step 612 executes by generating authentication token 506. Step 614 executes by receiving authentication token 506 at public policy server 112. Step 616 executes by determining the applicable private domain for the user according to domain list 146. Preferably, public policy server 112 uses the email address for the user to determine which private domain to access for the policy for the user.

Step 618 executes by retrieving policy 142 from private policy server 128 based on the receipt of authentication token 506 and domain 508 from public policy server 112. Private policy server 128 is identified according to the applicable domain 508 and queried by public policy server 112. Once verified, private policy server 128 sends policy 142 to public policy server 112.

Step 620 executes by determining the parameters for policy 142. This process is disclosed above. As shown in FIG. 4B, policy 142 may include parameters that outline what printing options are available to the user. Step 622 executes by applying the parameters to configure public policy server 112 to determine what print jobs or operations are available to the user in public domain 110.

Step 624 executes by determining whether the user is allowed to access printing device 104 using public domain 110 according to the policy. Further, step 624 determines what print jobs are available to the user according to policy 142. The determination also may include reviewing policy 142 for allowing other operations on printing device 104 such as scanning, editing, faxing, and the like. If no, then step 626 executes by sending a message to the user or public policy server 112 that the operation on printing device 104 is not allowed.

If step 624 is yes, then step 628 executes by retrieving the print job from private job server 126. A job list 511 may be provided. The print job is selected from job list 511. Job token 510 is generated by public policy server 112. Public policy server 112 sends job token 510 to private job server 126 to obtain job list 511. Upon selection of the print job, private job server 126 uploads binary data 140 for the print job to a location accessible by public file server 114. Step 630 executes by confirming access to binary data 140 for the print job by checking to see if the user has enough money to pay for using printing device 104. Other restrictions also may be checked, such as time of day, location, and the like, to confirm whether the print job should be released to printing device 104.

Step 632 executes by sending binary data 140 to printing device 104 upon confirmation in step 630. Public policy server 112 generates a confirmation token 514 to confirm that the user is allowed to print. Public policy server 112 may send confirmation token 514 to public file server 114. Upon receipt of the confirmation token, public file server 114 may forward binary data 140 for the print job to public policy server 112, which provides the data file to printing device 104.

Figure 7:
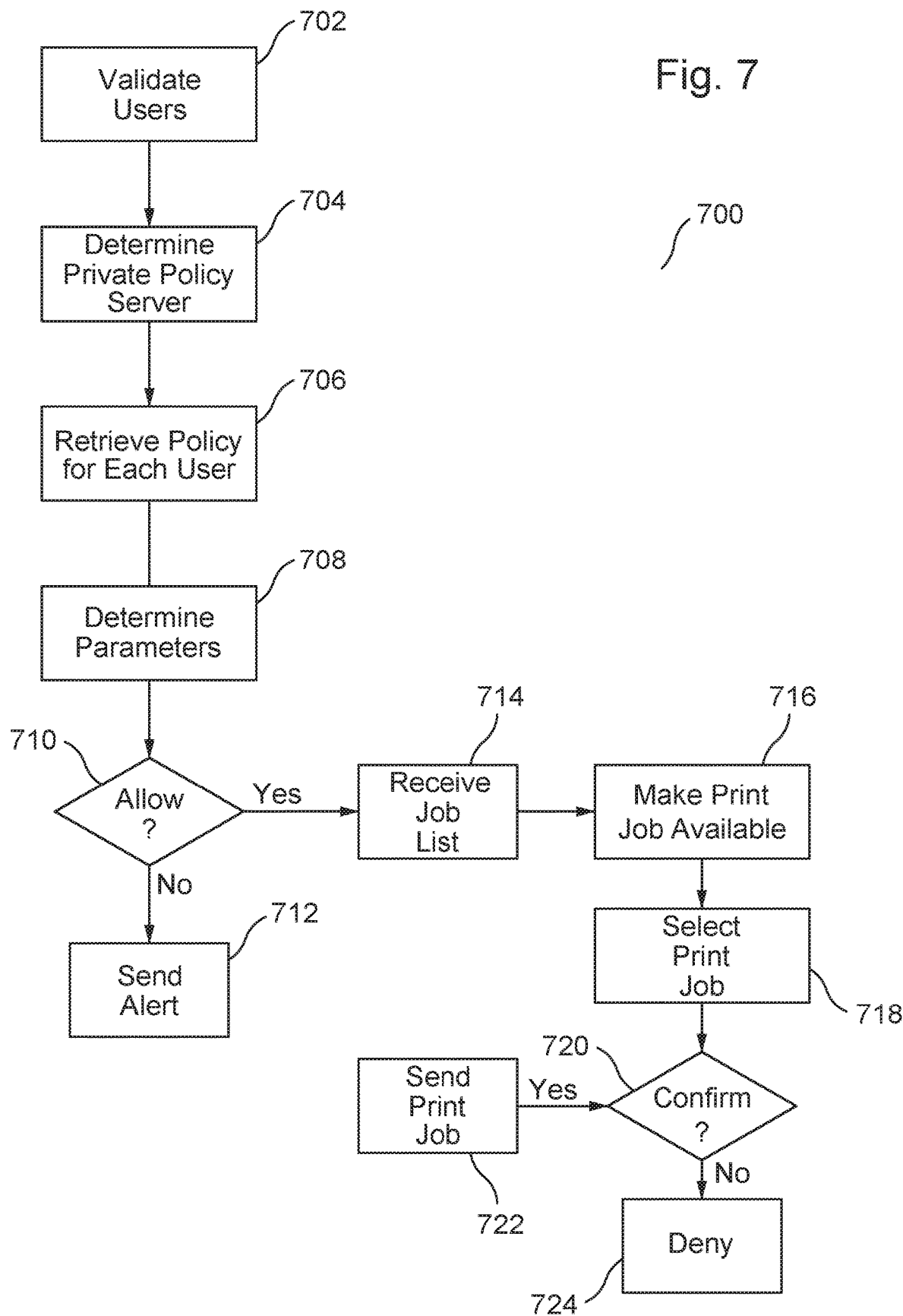
FIG. 7 illustrates a flowchart for implementing a policy-based printing system in a public domain according to the disclosed embodiments.

FIG. 7 illustrates a flowchart 700 for implementing a policy-based printing system 100 in a public domain 110 according to the disclosed embodiments. Flowchart 700 may refer back to elements disclosed in FIGS. 1-5 for illustrative purposes. The embodiments disclosed by flowchart 700, however, are not limited to the features disclosed in FIGS. 1-5. Further, flowchart 700 may compliment the embodiments disclosed by flow diagram 300.

As disclosed above, public policy server 112 may interact with a plurality of private domains. Public policy server 112 may retrieve and implement more than one policy for printing or processing print jobs in public domain 110. In some embodiments, public policy server 112 may implement policies for a plurality of public domains as well. Further, a plurality of printing devices may be connected to public policy server 112. Flowchart 700 discloses some embodiments that have public policy server 112 interacting with more than one private domain.

Step 702 executes by validating users within public domain 110 at private authentication server 124. As disclosed above, a protocol connection may be established between public policy server 112 and private authentication server 124 to exchange user information to perform the validation.

Step 704 executes by determining a private policy server for each user according to a domain for the user at public policy server 112. The domains for each user are private domains. Preferably, the email domain for each user indicates the applicable private domain for that user. With two or more users, different email domains may indicate more than one private domain. Step 706 executes by retrieving a policy 142 for each user according to the respective domain from private policy server 128.

Step 708 executes by determining the parameters for each policy 142. All of the policies are received at public policy server 112. Public policy server 112 configures the treatment of printing requests for each private domain according to the corresponding policy. The policy sets forth the parameters for printing from the private domain via the public domain. For example, the parameters for one policy may only allow 100 pages to be printed per user a month from private domain 120 while the parameters for another policy may only allow 20 pages to be printed per user from private domain 130. Public policy server 112 is configured accordingly.

Step 710 executes by determining whether the user is allowed to print according to the applicable policy. If no, then step 712 executes by sending an alert to public policy server 112 or to the user. No printing operations using public domain 110 are allowed. If yes, then step 714 executes by receiving a job list according to the applicable policy from private job server 126. Step 716 executes by making the print jobs in the job list available to the user. Step 718 executes by selecting a print job from the job list. Binary data 140 for the selected print job is retrieved from private job server 126 and made available to public file server 114.

Step 720 executes by confirming whether the print job may be sent to printing device 104. Public policy server 112 confirms that the user has enough funds or credits to perform the request task on printing device 104. If yes, then step 722 executes by sending the print job as binary data 140 to printing device 104. If no, then step 724 executes by denying the print job. The user may be prompted to provide additional funds or credits to perform the requested task.

Figure 8:
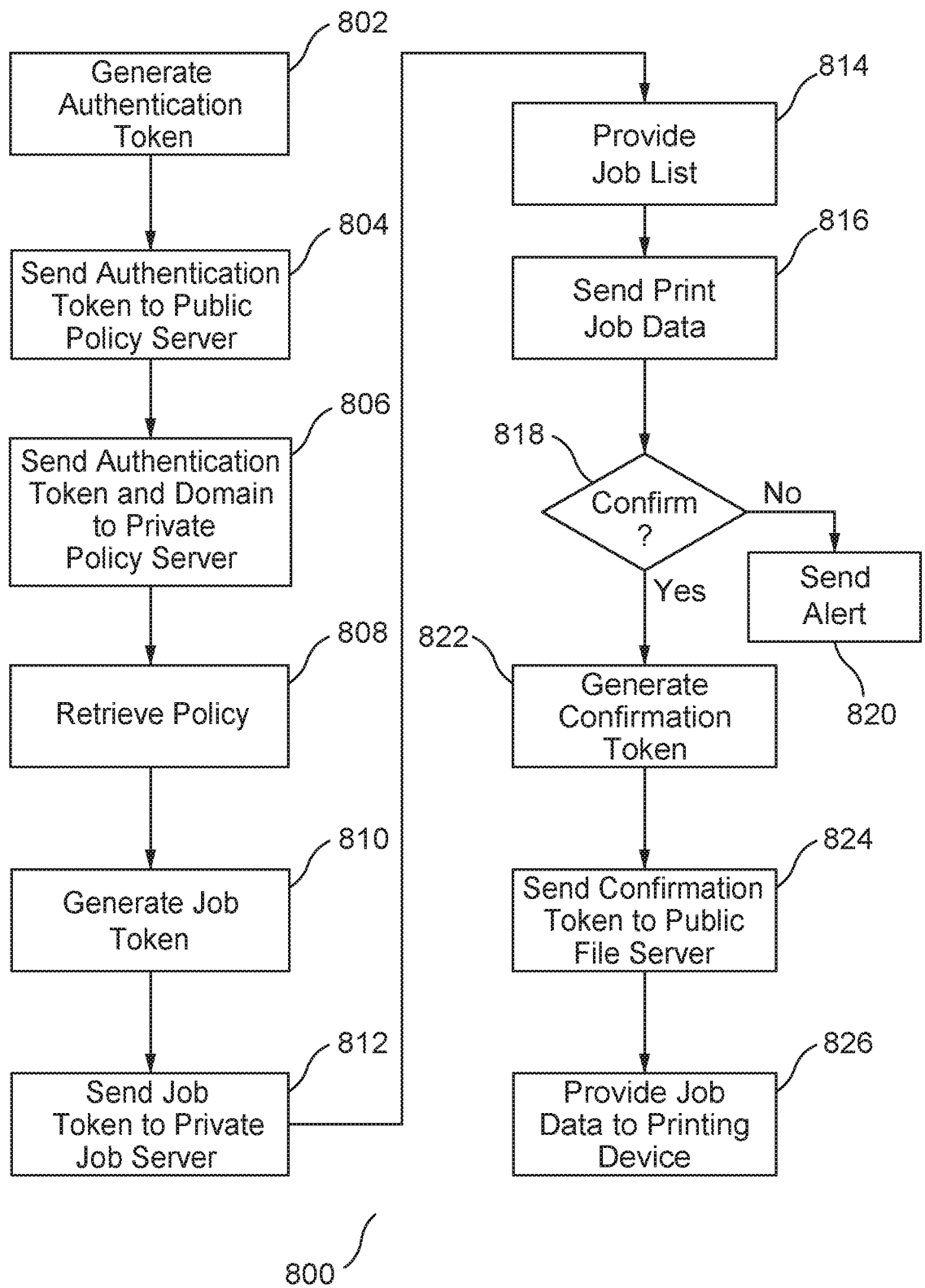
FIG. 8 illustrates a flowchart for implementing a policy-based printing system using tokens according to the disclosed embodiments.

FIG. 8 depicts a flowchart 800 for implementing a policy-based printing system 100 using tokens according to the disclosed embodiments. Flowchart 800 may refer back to elements disclosed in FIGS. 1-5 for illustrative purposes. The embodiments disclosed by flowchart 800, however, are not limited to the features disclosed in FIGS. 1-5. Further, flowchart 800 may compliment the embodiments disclosed by flow diagram 300.

Step 802 executes by generating authentication token 506 at private authentication server 124. This step occurs once private authentication server 124 validates a user attempting to print using public domain 110. Public policy server 112 sends user information 504 including an email address, username, password, or PIN to private authentication server 124. Private authentication server 124, being in private domain 120, may securely store this information for the user. The secure user information is not made available in public domain 110. Authentication token 506 indicates that the user may access private domain 120. Step 804 executes by sending authentication token 506 to public policy server 112.

Step 806 executes by sending authentication token 506 and domain 508 to private policy server 128. Public policy server 112 sends authentication token 506 and domain 508 after the domain is determined using domain list 146. An email address may indicate an email domain that is used as domain 508. Domain 508 indicates which private domain to access for the applicable policy. For example, referring to FIG. 4A, an email of user@example1.com will indicate private domain 120. Public policy server 112 attaches authentication token 506 to domain 508 and sends the request for the policy for the user.

Step 808 executes by retrieving policy 142 from private policy server 128. Authentication token 506 confirms that the user corresponds to the policy. Authentication token 506 may include data provided by private authentication server 124 that identifies the user as able to use private domain 120 and, therefore, policy 142 for the private domain should be used in printing on public domain 110. Private policy server 128 sends policy 142 to public policy server 112. Public policy server 112 then configures itself to apply the parameters of the policy to using public domain for the user.

Step 810 executes by generating job token 510 at public policy server 112 after applying the parameters of policy 142. The parameters may detail what the user can do using public domain 110. These parameters may not necessarily correspond to what the user can do using private domain 120. Limitations are placed on the user on how he/she can use printing device 104. Job token 510 may reflect the parameters to compile the job list of print jobs available to the user according to policy 142.

Step 812 executes by sending job token 510 to private job server 126. Private job server 126 may store the print jobs available to the user or to users in private domain 120. In some embodiments, a plurality of print jobs may be available such that a job list 511 is generated based on the parameters for the user in using public domain 110. Job token 510 may be used in generating job list 511 in that it includes information to select the appropriate print jobs to include in the print job list.

Step 814 executes by providing print job list 511 to public policy server 112. The user may select a print job from print job list 511. Alternatively, the desired print job may already be selected such that public policy server 112 receives data for the selection, such as from an application on a mobile device, that corresponds to the print job in job list 511. Public policy server 112 then requests the print job data from private job server 126. Step 816 executes by sending job binary data 140 for the selected print job from private job server 126 to public file server 114.

Step 818 executes by confirming whether the user may print or process the print job at printing device 104. For example, public policy server 112 may confirm that the user has enough funds in an account to pay for printing on printing device 104. If step 818 is no, then step 820 executes by sending an alert to the user or to public policy server 112 that printing operations are to be stopped until the condition is met. Using the above example, the user may be asked to provide additional funds to his/her account to print the document.

If step 818 is yes, then step 822 executes by generating confirmation token 514 by public policy server 112. Confirmation token 514 indicates that the processing of binary data 140 at printing device 104 may proceed. Step 824 executes by sending confirmation token 514 to public file server 114 to obtain binary data 140, which is stored thereon. Public file server 114 may send binary data 140 to public policy server 112 upon receipt of confirmation token 514.

Step 826 executes by providing binary data 140 to printing device 104. Public policy server 112 may send binary data 140 once a connection is established with printing device 104. Public policy server 112 may have to wait until printing device 104 is available before forwarding binary data 140. Thus, the data from private job server 126 is not made available on printing device 104 until the operations are ready to commence. Although the current embodiments discuss printing on printing device 104, other operations also may occur, such as scanning, editing, faxing, and the like.

Figure 9:
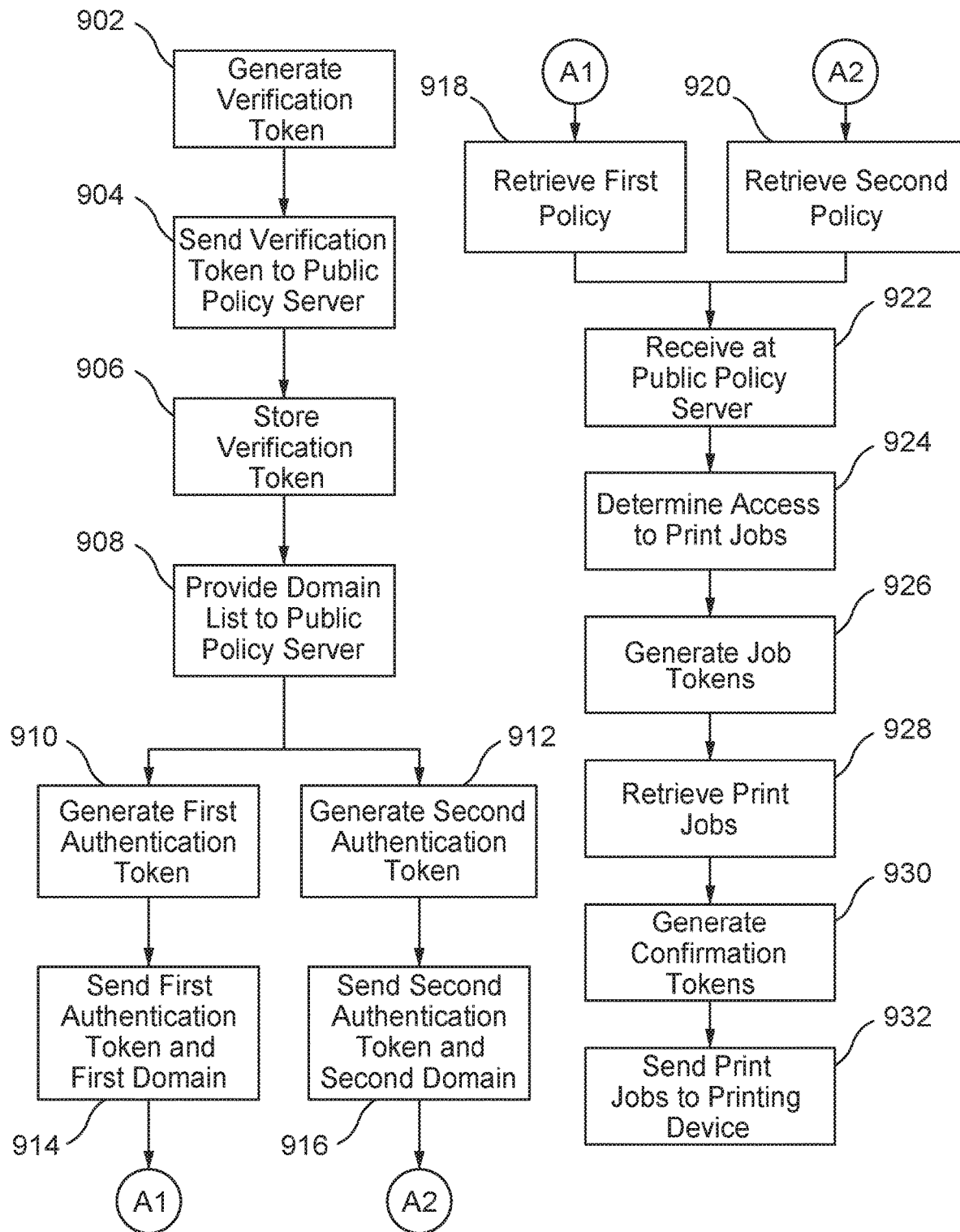
FIG. 9 illustrates a flowchart for selecting a plurality of print jobs from a plurality of private domains for printing in a public domain according to the disclosed embodiments.

FIG. 9 depicts a flowchart 900 for selecting a plurality of print jobs from a plurality of private domains 120 and 130 for printing in public domain 110 according to the disclosed embodiments. Flowchart 900 may refer back to elements disclosed in FIGS. 1-5 for illustrative purposes. The embodiments disclosed by flowchart 900, however, are not limited to the features disclosed in FIGS. 1-5. Further, flowchart 900 may compliment the embodiments disclosed by flow diagram 300.

As disclosed above, different policies apply to different to users and prints jobs from different private domains. One private domain may not allow color printing while another private domain may not allow unlimited printing. Thus, public policy server 112 configures itself to resolve the different requirements set forth in a plurality of policies from various private policy servers. Further, public policy server 112 may manage different job lists and print jobs from the plurality of private domains. Alternatively, a private domain may have different domains related to it, such as example1.com and example2.com for private domain 120 shown in FIG. 4A. Different policies may come from a single private policy server.

Step 902 executes by generating verification token 502 at private authentication server 124. Private authentication server 124 receives information about public policy server 112 in order to establish a protocol connection. Verification token 502 helps to establish a connection between private authentication server 124 and public policy server 112. Private authentication server 134 also may generate a verification token 502 to establish protocol connection to public policy server 112.

Step 904 executes by sending verification token 502 to public policy server 112. Step 906 executes by storing verification token 502 at public policy server 112. As long as public policy server 112 can present verification token 502 when requested or when submitting a print request for a user, the connection is established with private authentication server 124. Step 908 executes by providing domain list 146 from private authentication server 124 to public policy server 112. Domain list 146 may include information pertaining to a plurality of domains for a plurality of private domains, as disclosed by FIG. 4A.

Step 910 executes by generating a first authentication token 506. Step 912 executes by generating a second authentication token 506. The first authentication token may be generated in response to a first user providing user information at public policy server 112. The second authentication token may be generated in response to a second user providing user information at public policy server 112. Public policy server 112 may access the appropriate private authentication server to validate the user information for each user. In some embodiments, private authentication server 124 may validate both users and generate both authentication tokens. Alternatively, private authentication server 124 may generate the first authentication token while private authentication server 134 may generate the second authentication token. Public policy server 112 may have instructions when to use the different private authentication servers.

Step 914 executes by sending the first authentication token and a first domain to a first private policy server. Step 916 executes by sending the second authentication token and a second domain to a second policy server. Public policy server 112 determines which private domain is applicable to each user. The determination of the private domain may be based on the email address for each user. In some embodiments, public policy server 112 may send this data to a single private policy server, which stores different policies for different domains that use a single private domain. Alternatively, the authentication tokens and domains may be sent to separate private policy servers. For example, the first authentication token and first domain are sent to a first private policy server, such as private policy server 128. The second authentication token and the second domain are sent to a second private policy server, such as private policy server 138.

Flowchart 900 proceeds to steps A1 and A2 for steps 914 and 916, respectively. Steps A1 and A2 then proceed to steps 918 and 920, respectively. Step 918 executes by retrieving a first policy, such as policy 142, in response to the first authentication token and the first domain. Step 920 executes by retrieving a second policy, such as policy 142, in response to the second authentication token and the second domain. In some embodiments, the first policy is stored on private policy server 128 and the second policy is stored on private policy server 138. Alternatively, both policies may be stored on private policy server 128 or 138. The first policy may apply to the first user and the second policy may apply to the second user.

Step 922 executes by receiving the first and second policies at public policy server 112. Step 924 executes by determining access to a first print job according to the first policy and access to a second print job according to the second policy. Public policy server 112 may configure the parameters of each policy to determine what type of print jobs may be made available to each user. For example, the first print job may not be available to the second user according to the second policy. The determination of access may relate to what print jobs are available to the users over public domain 110.

Step 926 executes by generating first and second job tokens, such as job token 510, based on the first and second policies at public policy server 112. A first job token is generated for the first policy and a second job token for the second policy. In some embodiments, the first job token may be sent to private job server 126 and the second job token may be sent to private job server 136. The different private job servers are in separate private domains. Alternatively, the job tokens may be sent to private job server 126 or 136.

Step 928 executes by retrieving a first job list, such as job list 511, based on the first policy and the received first job token and retrieving the second job list, such as job list 511, based on the second policy and the received second job token. The applicable private job server or servers provide the job lists to public policy server 112. The first user may select a first print job from the first print job list. The second user may select a second print job from the second print job list. These requests are communicated back to the application private job server or servers. The binary data for the first and second print jobs are sent to public file server 114.

Step 930 executes by generating confirmation tokens, such as confirmation token 514, at public policy server 112 to indicate that the print jobs may be processed at printing device 104. Public policy server 112 may confirm that each user has enough funds in his/her account to perform operations on printing device 104, as disclosed above. A first confirmation token for the first print job is presented to public file server 114. A second confirmation token for the second print job is presented to public file server 114. Public file server 114 provides the binary data for each print job to public policy server 112. Step 932 executes by sending the binary data for the first and second print jobs to printing device 104.

In some embodiments, it may be desired to not provide the policy to the public domain, either in a public domain server or the printing device. The policy could include details that are sent to many components within the system. Some servers and devices may not be able to implement the policy effectively. A policy may be a complex concept. Whenever policy data arrive at the device, the data may need to be parsed correctly and applied correctly when a print job is sent to the device. These operations may impose a heavy burden on the development and maintenance of the device. Preferably, the printing system would like the printing device, for example, to focus on what it does, such as printing, scanning, or copying.

Figure 10:
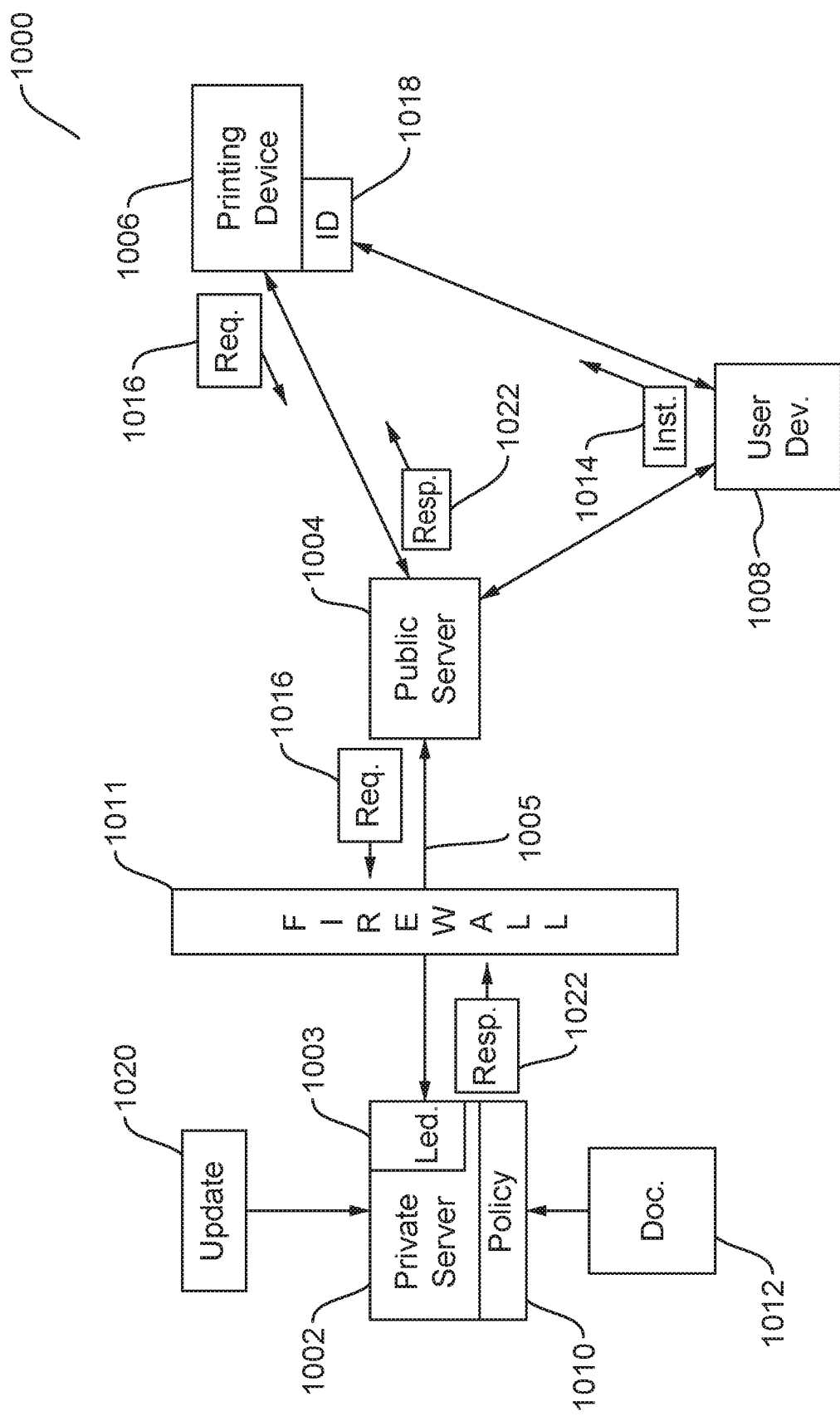
FIG. 10 illustrates a policy-based system to implement policy-based printing using a private server according to the disclosed embodiments.

FIG. 10 illustrates a policy-based system 1000 to implement policy-based printing using a private server 1002 according to the disclosed embodiments. System 1000 may reduce development and maintenance responsibilities in multiple components in the system and provide additional security with an advanced policy. In some embodiments, a private server at the corporate office, or private domain, has the policy set by an administrator. The policy changes frequently and becomes more complex with each evolution of software within the printing system or on the devices.

On the private server, a ledger may exist that records all the actions performed by all end user who are printing, copying, scanning, and the like within system 1000. The users may utilize printing devices and servers in a public domain such that they perform actions outside the normal corporate environment. A public server may serve as a gateway to the private domain. It may have open websocket bi-directional communication with the private server, as disclosed above. The printing device is connected to the public network and also is connected to the public server to whether it can do a simple action on behalf of the user in processing a document.

Within the disclosed printing system, the user may use allowed printing or access to documents in each policy period in an uneven manner. The user does not use the services of the printing devices the same way or amount every period. One period may not use the allotted number of pages to be printed while another period may exceed the limit placed on the user by the policy. Further, usage from a future period may be used and applied to the current period in order to allow the user to print documents. The disclosed embodiments address this imbalance to improve the user experience and provide better usage strategies for the user and the business.

FIG. 10 shows a policy-based system 1000 having a private server 1002, a public server 1004, a printing device 1006, and a user device 1008. These components of the system may be disclosed above with regard to FIGS. 1-9. In system 1000, private server 1002 may refer to any of the servers in the private domain, such as private authentication server 124, private job server 126, and private policy server 128 of private domain 120 shown in FIG. 1. Private server 1002 may be used in system 1000 to mean any server or group of servers in a private domain, as disclosed above. Private server 1002 may be separated from servers and printing devices in public domains by firewall 1011. Private server 1002 also stores and applies policy 1010. Policy 1010 may correspond to policy 142 disclosed above.

Public server 1004 may refer to any of the servers in the public domain, such as public file server 114 and public policy server 112 of public domain 110 shown in FIG. 1.

Public server 1004 may be accessible by a plurality of printing devices, including printing device 1006. In the public domain, public server 1004 may manage print jobs going to various printing devices. It also may include a connection to private server 1002, which has been verified and authenticated according to the processes disclosed above. For example, a websocket connection 1005 may exist between private server 1002 and public server 1004.

Printing device 1006 may receive documents from public server 1004 as well as other sources to print, modify, and the like. The features of printing devices according to the disclosed embodiments are disclosed above. Printing device 1006 may include device identification 1018 that indicates a unique identifier within system 1000. In some embodiments, device identification 1018 may be a number, alphanumeric characters, or a combination thereof. Public server 1004 may send documents and files to printing device 1006 based on device identification 1018.

User device 1008 may be a mobile device, tablet, computer, and the like. User device 1008, in some embodiments, may be a kiosk with which the user interacts to print the document. The kiosk may be located next or within the vicinity of the printing device. The user may request a document to print using the kiosk. If user device 1008 is a kiosk, then it resides in the public domain at the location of printing device 1006. If user device 1008 is a mobile device, then user device 1008 may move between the private domain and the public domain, as separated by firewall 1011. It also may access private server 1002 as well as public server 1004. A user may send and receive data from the servers at user device 1008. User device 1008 also may send instructions 1014 to printing device 1006 to print, copy, scan, and the like stored documents from private server 1002.

Private server 1002 may upload document 1012. Document 1012 may be similar to the print jobs disclosed above. Document 1012 includes data and information that is transmitted to devices within the private domain. The user of user device 1008 may upload document 1012 within the private domain. Document 1012, however, may be processed and printed at devices outside the public domain and not necessarily at devices connected to private server 1002. Policy 1010 also may be used to determine how and if document 1012 is used within system 1000 outside the private domain.

The user may authenticate user device 1008 to public server 1004 according to the disclosed embodiments. For example, user device 1008 may provide verification data, such as a user/account name and password, to verify the user to public server 1004. This process may be disclosed above with regard to verification between public policy server 112 and private authentication server 124. Alternatively, the verification data may be a token used by user device to authenticate the user in a public domain. Upon authentication, websocket connection 1005 may be established to allow open bi-directional communication between private server 1002 and public server 1004.

In some embodiments, printing device 1006 receives instructions 1014 from user device 1008 to process document 1012. An electronic copy of document 1012 may be sent to printing device 1006 to process and print, copy, scan, and the like. The user also may modify the electronic copy. In summary, a document stored on private server 1002 is made available on a public device.

Before receiving document 1012, printing device 1006 in conjunction with public server 1004 and private server 1002 may determine whether any action on behalf of the user is allowed at the printing device. An action by printing device 1006 is a simple operation of print, copy, scan, and the like. It may be measured in the smallest scale possible, such as a single page at a time. Thus, printing device 1006 may send request 1016 to public server 1004, which is then forwarded to private server 1002. Preferably, request 1016 includes queries for policy 1010 as closed questions that result in a YES or NO response. Printing device 1006 merely has to determine whether it can perform an operation or not. Printing device 1006 does not do any analysis of policy 1010.

Public server 1004 receives request 1016 pertaining to the user instructions to printing device 1006 to process document 1012. Public server 1004 may forward request 1016 without further processing. In other embodiments, public server 1004 may break down request 1016 into smaller requests that permit the responses to be in a YES or NO format. Upon receipt of responses from private server 1002, public server 1004 may forward document 1012 or provide further instructions to printing device 1006.

Private server 1002 receives request 1016 from public server 1004 via websocket connection 1005. If no websocket connection exists, then private server 1002 may not receive the request and public server 1004 responds to printing device 1006 with an alert that printing, copying, scanning, and the like for request 1016 is denied. Upon receipt of request 1016, private server 1002 analyzes policy 1010 to determine whether the action is allowed for the user on printing device 1006. Private server 1002 also compiles or accesses ledger 1003 to determine if the action is allowed. Ledger 1003 may be a record or file of all fine grained action within system 1000 that provides the status of the account for the user. For example, ledger 1003 may indicate how many pages that the user has printed in the policy-set period, costs incurred, and other statistics of actions limited by policy 1010.

Update 1020 also may be received at private server 1002 that impact policy 1010 and ledger 1003. Update 1020 may change the parameters of interest to policy 1010 or provide temporary adjustments to the policy. For example, the user may exceed his/her printing page limit by a specified number of pages for a 24 hour period. The user is attending an important off-site meeting or conference that would provide a good reason to exceed the daily printing limit. Update 1020, however, is not meant to be permanent. In the disclosed embodiments, update 1020 may be implemented in a more efficient manner by keeping policy 1010 at private server 1002 as opposed to having it stored on public server 1004. Private server 1002 does not need to update policies in the public domain or on different devices because all policy analysis and determinations may be performed at the private server. In some embodiments, update 1020 may modify policy 1010 to allow unused usage from a previous period or borrow usage from a future period for a current period.

Depending on the results of the determination, private server 1002 sends response 1022 to public server 1004. Response 1022 may include a copy of document 1012 for printing. Response 1022 may include more than one response, but is shown as a single response for brevity. Public server 1004 may analyze the response to ensure it is appropriate. Public server 1004 forwards response 1022 to printing device 1006, which acts accordingly. In some embodiments, public server 1004 also may send response 1022 or a message associated thereto to user device 1008. The response sent to user device 1008 also may include statistics or information regarding the status of the user's account based on ledger 1003 and policy 1010.

System 1000 shows user device 1008 sending instructions 1014 to printing device 1006. In some embodiments, the user may interact directly with printing device 1006 to process document 1012 thereon. Use of a user device 1008 is not required to print, copy, or scan a document at printing device 1006 or within the public domain.

Figure 11:
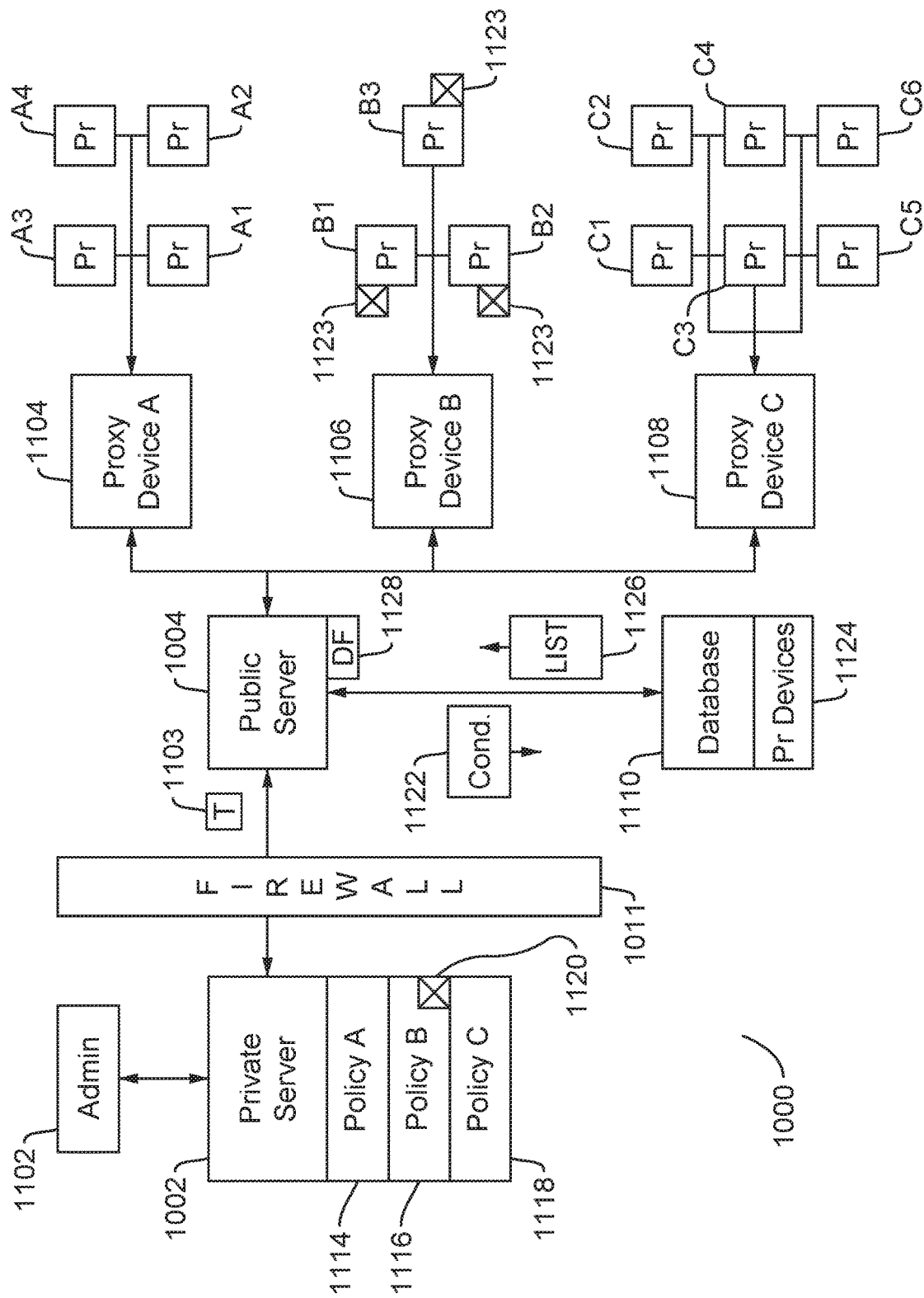
FIG. 11 illustrates a printing system using proxy printing devices to manage a plurality of printing devices according to the disclosed embodiments.

FIG. 11 depicts printing system 1000 using proxy printing devices to manage a plurality of printing devices according to the disclosed embodiments. FIG. 10 shows a single printing device 1106. Many systems, however, send and receive information to many different printing devices. Private server 1002 may store documents accessible from many different printing devices. Each device may have its own characteristics and conditions, such as location, manufacturer, owner, and the like. The disclosed embodiments may use proxy printing devices to manage these many different printing devices using the private server and the public server relationship along with applying policies to print jobs from the different printing devices, as disclosed above.

Further, from a system administrator point of view, management of so many printing devices may be very resource intense and time consuming. The location and the number of public printing devices keeps changing. New printing devices are installed and older printing devices are removed from the system. Moreover, the per page cost may differ between locations or the provider of the service, such as different convenience stores. In some instances, the number of printing devices for a large company may exceed 1000. This large number may place a strain on private server 1002 and any associated administrator when managing policies applicable to requests received from the many printing devices.

The disclosed embodiments may create and use one or more proxy printing devices to manage the large number of printing devices within a printing system. Referring to FIG. 11, proxy printing devices 1104, 1106, and 1108 may be used to manage different sets of printing devices in addition to private server 1002 and public server 1004, as disclosed above. The proxy printing devices may be recognized by public server 1004 as devices having common characteristics, or conditions, that allow the printing devices to be grouped together. Further, a corresponding policy may be applied to print requests coming from the proxy printing device and, in turn, determine whether the print requests are accepted. According to private server 1002, the print requests are coming from a single printing device, which is the proxy printing device.

In some embodiments, the proxy printing devices are created by public server 1004. An administrator 1102 may access private server 1002 to indicate a specific condition on which to identify printing devices having the condition. "Administrator" may refer to a device used by an administrator allowed to access private server 1002, also called an administrator device. A connection may be made between the administrator device and private server 1002. Administrator 1102 may instruct public server 1004 to search public domain printing devices with a specific condition based on needs. Examples of conditions may include location, such as country, state, prefecture, city, town, and the like. Conditions also may include postal code, service provider, device information, and the like. Service provider may refer to the organization or company providing the printing devices to the public, such as an office supply store, convenience store, department store, post office, and the like.

The condition indicated by administrator 1102 also corresponds to a parameter or "condition" of a policy stored at private server 1002. The policies apply to specific groups of printing devices, also divided by the condition. For example, private server 1002 includes policies 1114, 1116, and 1118. Each policy may correspond to a different service provider, such as different convenience stores hosting printing, copying, scanning, and facsimile services. Thus, policy 1114 may refer to a policy A for Company A. Policy 1116 may refer to a policy B for Company B. Policy 1118 may refer to a policy C for Company C. Each company has its own rules, restrictions, overage limits, and the like. As users print from different companies, the applicable policy is applied to determine whether to allow print jobs. Administrator 1102 may identify a condition from the different policies to use in forming the proxy printing devices.

Thus, in system 1000, proxy device A 1104 manages printing devices A1, A2, A3, and A4. Proxy device A 1104 is created using a condition applicable to policy A 1114. Administrator 1102 identifies a condition that allows policy A 1114 to be applied to requests coming from printing devices A1-A4, such as a common service provider, location, cost per page, model type, and the like. Proxy device B 1106 is created using a condition applicable to policy B 1116 and manages printing devices B1, B2, and B3. Proxy device C 1108 is created using a condition applicable to policy C 1118 and manages printing devices C1, C2, C3, C4, C5, and C6. As can be appreciated, the proxy devices may manage any number of printing devices that include the specified condition. Proxy devices also may be known as "proxy printing devices" below. In some embodiments, proxy printing devices are not actual printing devices but virtual devices created to execute the functions disclosed herein.

Figure 12:
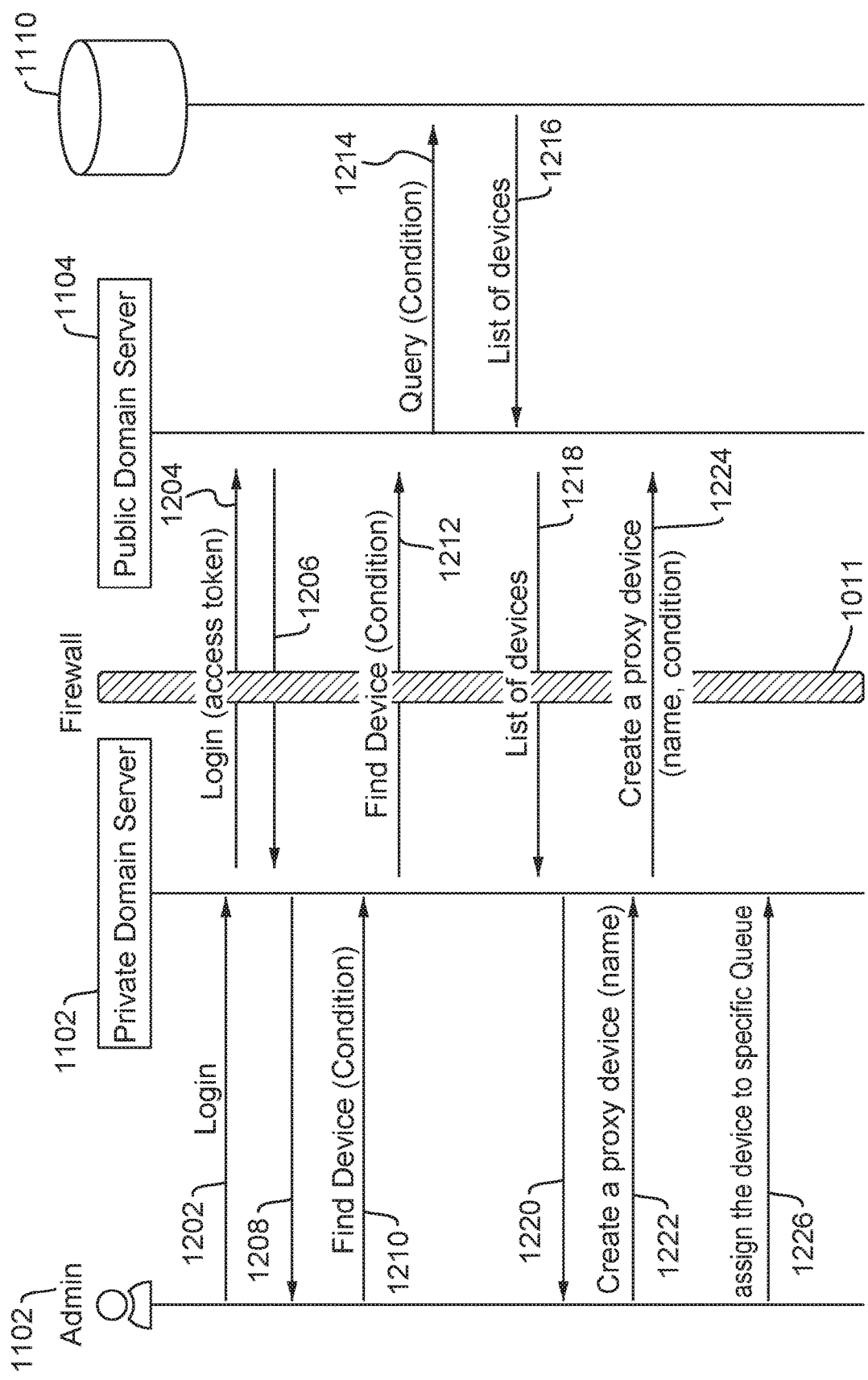
FIG. 12 illustrates a flow diagram for implementing a policy-based printing system having a proxy printing device according to the disclosed embodiments.

The processes for creating virtual proxy printing devices and managing printing devices may be disclosed by FIG. 12, which depicts a flow diagram 1200 for implementing a policy-based printing system 1000 having a proxy printing device B 1106 according to the disclosed embodiments. Flow diagram 1200 will refer to features shown in FIGS. 1-11 for illustrative purposes. Specifically, the disclosure of flow diagram 1200 may refer to the creation and use of proxy printing device B 1106 based on policy B 1116.

Operation 1202 executes by administrator 1102 logging into private server 1102. Operation 1204 executes by logging the administrator into public server 1004 using an access token 1103 provided by private server 1002. Access token 1103 allows private server to access public server 1004 based on the credentials of administrator 1102. Public server 1004 confirms that administrator 1102 may access its functions and data in order to create and manage proxy printing devices. Operation 1206 executes by confirming access by administrator 1102 to private server 1002 as well as establishing connection 1005. Operation 1208 executes by indicating the connection to public server 1004 via private server 1002 to administrator 1102.

Administrator 1102 now may identify printing devices to manage using a created proxy printing device. Public printing devices may be searched with a specific condition. Each printing device may include property information such as:
Printer Name
Model Name
Internet Protocol (IP) Address
Serial Number
Location or Postal Code
Service Provider Code or Name Operation 1210 executes by administrator 1102 specifying a condition to find printing devices. In some embodiments, the condition may correspond to some parameter or condition set forth in a policy. For example, if the policy applies to a user printing from a certain service provider, then the service provider would be the condition used in identifying printing devices. Thus, administrator 1102 may form a query at private server 1002 relating to parameter 1120 of policy B 1116. The parameter may be limits on printing documents at a service provider. Thus, condition 1122 would be the service provider. Operation 1212 executes by private server 1002 generating the query for a list of printing devices having condition 1122. Operation 1212 sends the query to public server 1004. Thus, administrator 1102 does not directly access public server 1004.

Operation 1214 executes by public server 1004 using the query to form a search of printing devices managed by private server 1002. Condition 1122 is sent to database 1110 as part of the query from public server 1004. Database 1110 may be a data repository that includes a table 1124 of printing devices with the above listed information, plus any additional information. Database 1110 may include an IP address in which to send the query. Database 1110 receives the query and identifies the printing devices available to private server 1002 meeting condition 1122.

For example, condition 1122 may be a Location Code of 1234. Location Code 1234 may be mapped to a specific location information table as table 1124. The search of table 1124 will identify those printing devices meeting the location code condition. A list 1126 having a format may be generated with information on the identified printing devices. For example, list 1126 may include the following information for each identified printing device for Location Code 1234: Location name, Country, State or Prefecture, Postal code, enabled services, and the like.

In another example, condition 1122 may be a Service Provider Code of abcd, which identifies a specific convenience store that hosts printing devices that may access private server 1002. Public server 1004 may send the query with the Service Provider Code to database 1110. Service Provider Code abcd may be mapped to a specific service provider information table as table 1124. Thus, database 1110 may include different tables 1124 or may organize data to meet the search conditions. A search of table 1124 will identify those printing devices meeting the service provider condition. List 1126 is generated and may include the following information for each identified printing device for Service Provider Code abcd: Service Provider name, unit price of black and white print, unit price of color print, and the like.

As shown in FIG. 11, printing devices B1, B2, and B3 include conditions 1123, which corresponds to condition 1122 used in the search. These printing devices are identified as meeting the condition and included in list 1126 sent to public server 1004. Conditions 1123 may not be exactly the same as condition 1122. For example, condition 1122 may be a code for a service provider and conditions 1123 may be the name of the service provider as listed for the printing devices. Database 1110 compiles printing devices B1, B2, and B3 into the list along with the other device property information. Printing devices not having condition 1123, such as printing devices A1-A4 or C1-C6, are not included in list 1126.

It should be noted that another applicable condition may be the prices among the different service providers. Thus, policy B 1116 may relate to those printing devices that print in a certain price range for parameter 1120. Condition 1122 may be a price per page to print within that price range. Table 1124 is searched for printing devices printing with the price condition, even if across different service providers. Price information for the different providers is not made public or available.

Operation 1216 executes by providing list 1126 to public server 1004. Public server 1004 may store the information in list 1126 as data file 1128. Public server 1004 maintains data file 1128 as printing devices come and go from the original list. This feature is disclosed in greater detail below. Data file 1128 may periodically update or receive information that a printing device is to be included in the list of printing devices or removed. A condition on a printing device may change in that it no longer meets the requirements to be included in the grouping identified by administrator 1102. Public server 1004 uses data file 1128 to update the listing of printing devices generated with list 1126.

Operation 1218 executes by sending list 1126 from public server 1004 to private server 1002. Operation 1220 executes by sending list 1126 of the identified printing devices to administrator 1102. Administrator 1102 may modify the list of printing devices, such as removing printing devices that are not of interest or adding those that may be needed. Operation 1222 executes by creating a proxy printing device name, such as the name of the service provider or other name related to the collection of printing devices identified in list 1126. Administrator 1102 may create the name, and, in essence, the proxy printing device at private server 1002.

Operation 1224 executes by sending the name for the proxy printing device along with the corresponding condition from private server 1002 to public server 1004. Public server 1004 may create the proxy printing device using the name and the condition along with the information in data file 1128. For example, if the condition is Service Provider Code abcd, then the name for the proxy printing device may be the convenience store associated with the code. Thus, proxy printing device B 1106 is created and printing devices B1, B2, and B3 assigned thereto. The name and the condition are not provided publicly and kept in private between private server 1002 and public server 1004. Within system 1000, proxy printing device B 1106 is treated as a single printing device, which manages printing devices B1-B3.

Operation 1226 executes by assigning proxy printing device B 1106 to a specific queue. Proxy printing device B 1106 may provide requests and print jobs through the queue to public server 1004 to private server 1002. Private server 1002 also applies the appropriate policy to requests coming from proxy printing device B 1106, or policy B 1116. It does not apply policy A 1114 or policy C 1118, even though these policies may be applicable to a user printing from one of the devices managed by the proxy printing device B. Condition 1122 may identify policy B 1116 as the applicable policy for requests coming from proxy printing device B 1106.

The same processes may be used to create proxy printing device A 1104. A different condition is specified to identify printing devices A1-A4 which relates to policy A 1114. Proxy printing device C 1108 also may be created using a condition 1122 to generate a list 1126 corresponding to policy C 1118. In some embodiments, a printing device may be managed by more than one proxy printing device. For example, printing device B1 and printing device C1 may refer to the same printing device. Proxy printing device B 1106 may include a condition of a service provider while proxy printing device C 1108 may include a condition of a location. Thus, policies B 1116 and C 1118 may apply to a request coming from this printing device, which may involve the request being submitted to private server 1002 from both proxy printing devices. Private server 1002 may apply both policies to determine whether the user is allowed to print at the printing device. In some embodiments, a denial under one policy results in no printing at the printing device. Alternatively, an allowance under one policy may result in printing at the printing device. Administrator 1102 may form internal policies to manage such a situation.

Figure 13:
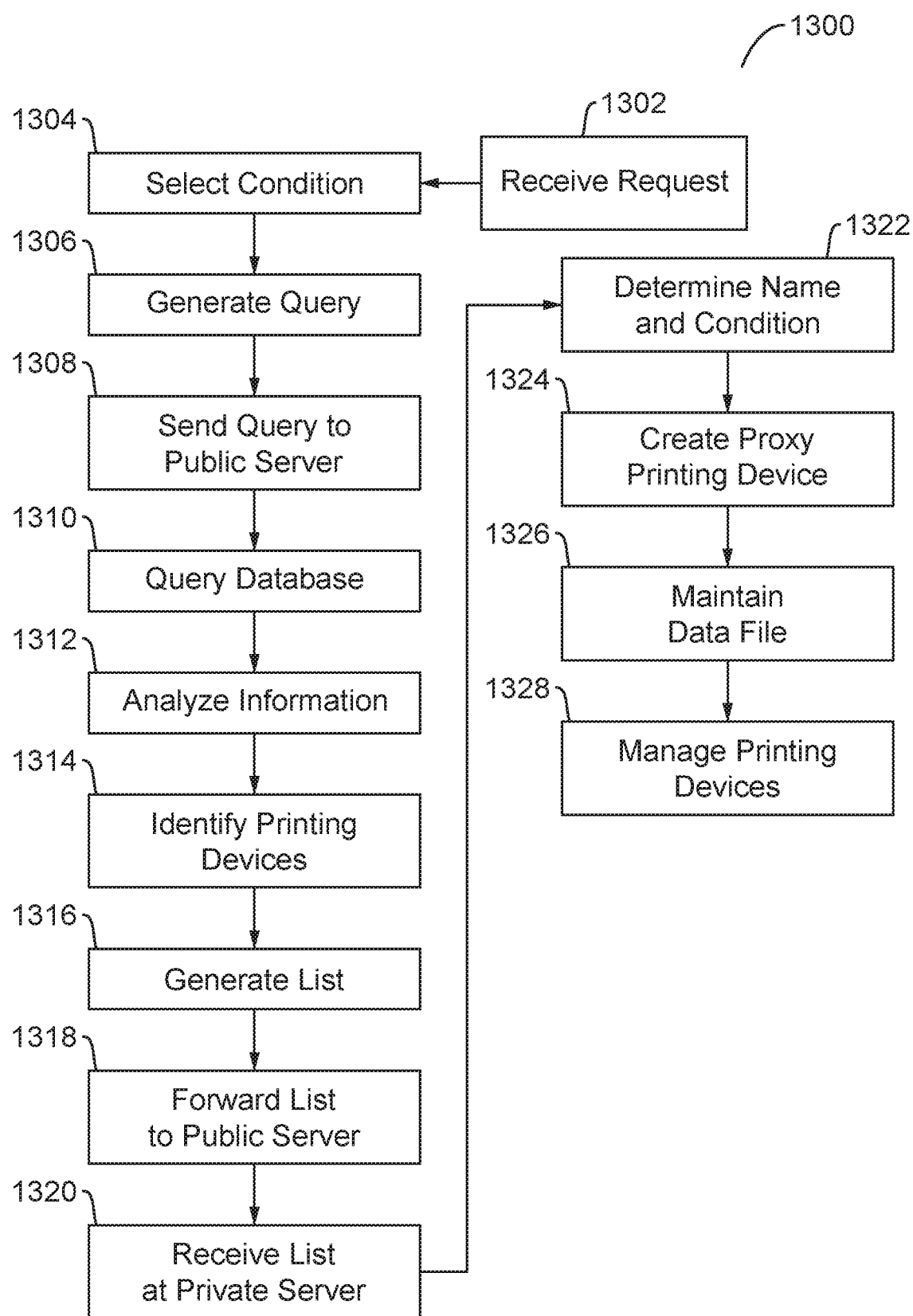
FIG. 13 illustrates a flowchart for creating a proxy printing device according to the disclosed embodiments.

FIG. 13 depicts a flowchart 1300 for creating a proxy printing device according to the disclosed embodiments. Flowchart 1300 may refer to FIGS. 1-12 for illustrative purposes. Flowchart 1300, however, is not limited by the features disclosed by FIGS. 1-12.

Step 1302 executes by receiving a request at private server 1002 from administrator 1102 to create a proxy printing device. More specifically, the request is received from an administrator device 1102. Private server 1002 then may establish connection 1005 with public server 1004 using access token 1103 from administrator 1102. Step 1304 executes by administrator 1102 selecting a condition 1122 to be used in creating the proxy printing device. As disclosed above, condition 1122 may be associated with a parameter or other feature 1120 of a policy on private server 1002.

Step 1306 executes by generating a query based on condition 1122 at private server 1002 for a list 1126 of a plurality of printing devices having the condition. Step 1308 executes by sending the query to public server 1004 from private server 1002. Public server 1004 receives the query and uses the condition to form its own query. It also uses information provided in the query, such as the IP address or name of private server 1002 to determine which database 1110 or printing device table 1124 to analyze for possible printing devices having the condition. This feature allows the information about private server 1002 and administrator 1102 to remain hidden from database 1110 and the printing devices in system 1000.

Step 1310 executes by querying database 1110 storing information in printing device table 1124 about the printing devices that may access private server 1002. As disclosed above, information about applicable printing devices may be stored in table 1124 so that the condition may search and analyze this information. Thus, step 1312 executes by analyzing the information within the table using condition 1122. Step 1314 executes by identifying a set of printing devices, such as printing devices B1, B2, and B3, having condition 1123 related to condition 1122, from the overall plurality of printing devices. The printing devices are connected or accessible by public server 1004.

Step 1316 executes by generating list 1126 of the identified printing devices having condition 1123. The list may be configured with property or additional information pertaining to the identified printing devices. Step 1318 executes by forwarding list 1126 to public server 1004. Public server 1004 for generate data file 1128 from list 1126 and store it thereon. Public server 1004 also may verify the connection to the printing devices identified in list 1126 and remove those not available or accessible. Public server 1004 also may check to determine if the identified printing devices still include the condition used in the query.

Step 1320 executes by receiving list 1126 at private server 1002. Private server 1002 may verify that the identified printing devices in list 1126 correspond to the policy used in forming the query and determining condition 1122. For example, if condition 1122 is a location code, policy A 1114, used in selecting condition 1122, may be checked to determine if the location code is still applicable to the policy. Further, private server 1002 may determine whether the identified printing devices are managed by the private server.

Step 1322 executes by determining a name for the set of printing devices identified in list 1126. The name may become the name for the applicable proxy printing device. Further, private server 1002 corresponds condition 1122 with the name Step 1324 executes by creating the proxy printing device, such as proxy printing device B 1106, based on condition 1123 corresponding to condition 1122 for printing devices B1, B2, and B3. The proxy printing device may be created by public server 1004, which then informs private server 1002 of the creation. Data file 1128 may be associated with the proxy printing device. Step 1326 executes by maintaining data file 1128 for the proxy printing device. Public server 1004 may add and remove printing devices from data file 1128 as needed.

Step 1328 executes by managing the set of printing devices using the proxy printing device. This feature is disclosed in greater detail below. Requests for printing documents at private server 1002 may generate from a proxy printing device. Private server 1002 then applies a policy as needed to the requests. Private server 1002 treats the proxy printing device as the printing device even though the requests may come from a plurality of printing devices.

Figure 14:
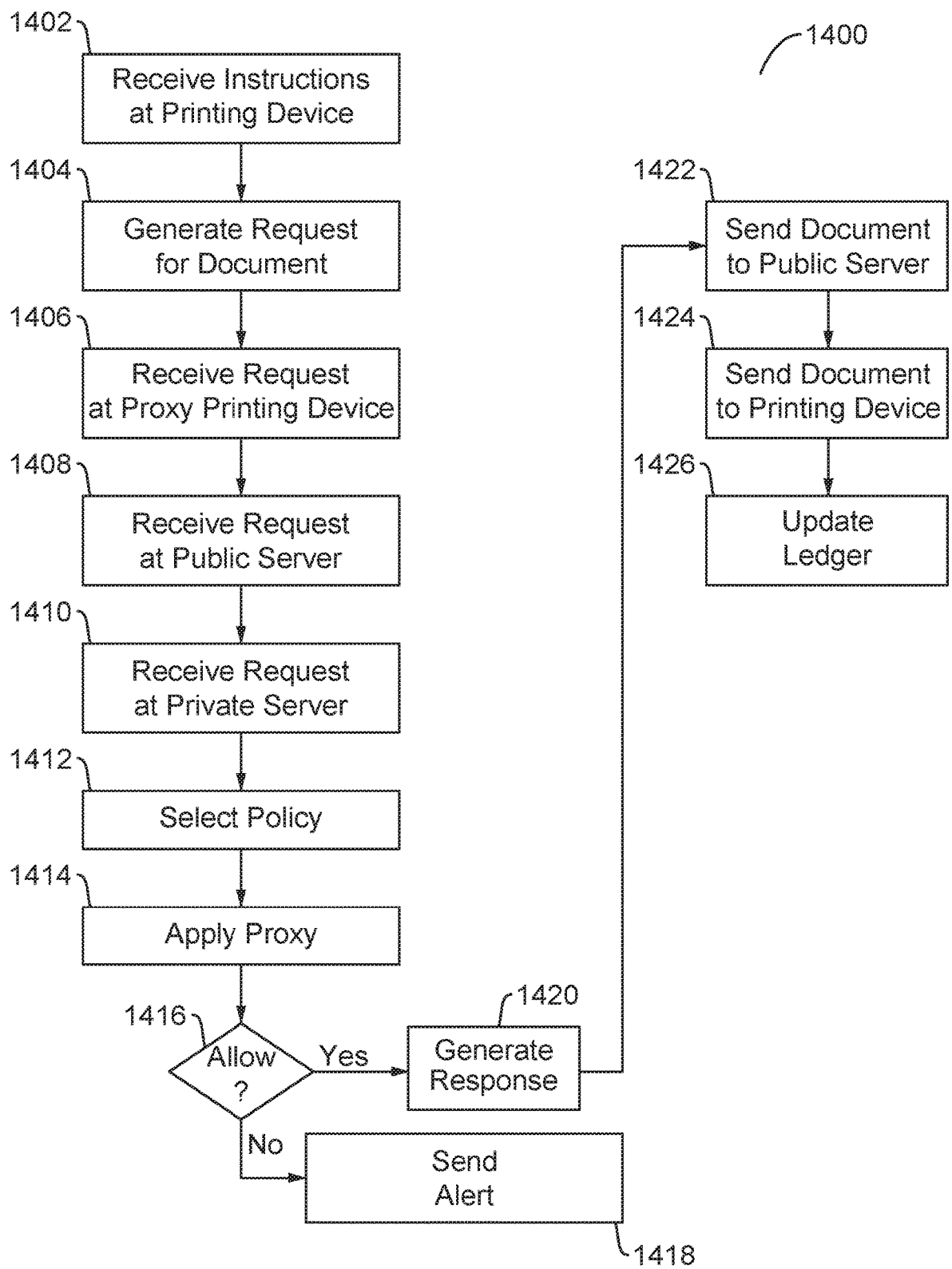
FIG. 14 illustrates a flowchart for printing a document using a proxy printing device according to the disclosed embodiments.

FIG. 14 depicts a flowchart 1400 for printing a document using a proxy printing device according to the disclosed embodiments. Flowchart 1400 may refer to FIGS. 1-13 for illustrative purposes. Flowchart 1400, however, is not limited by the features disclosed by FIGS. 1-13.

Step 1402 executes by receiving instructions 1014 from user device 1008 at a printing device. For example, instructions 1014 may be received at printer B2, shown in FIG. 11. Instructions 1014 include a print job request for document 1012 stored on private server 1002. Step 1404 executes by generating a request 1016 to print document 1012 at printing device B2. The request may include a print job to print the document.

Step 1406 executes by receiving request 1016 at proxy printing device B 1106, which manages printing device B2. Printing devices B1, B2, and B3 route their print jobs to proxy printing device B 1106. Proxy printing device B 1106 corresponds to conditions 1123 on the printing devices. Proxy printing device B 1106 may determine whether printing device B2 is listed within data file 1128. Step 1408 executes by receiving request 1016 at public server 1004. In a sense, proxy printing device B 1106 is at public server 1004 in that the public server hosts data file 1128. Public server 1004 may provide the platform to create and maintain the proxy printing device, as it preferably is not a physical device apart from other devices. Public server 1004, however, receives the request for the print job after it has been received by the proxy printing device. Public server 1004 also may determine whether the print job is acceptable to be sent to the private server.

Step 1410 executes by receiving request 1016 at private server 1002. This process may be disclosed above. Private server 1002 may do some verification that the request is proper and acceptable from public server 1004. Step 1412 executes by selecting a policy to apply to request 1016 based on a user of printing device B2 and proxy printing device B 1106. As disclosed above, a parameter or characteristic 1120 in policy B 1116 is used to select condition 1122, which in turn is used to create proxy printing device B 1106. Private server 1002 uses this relationship to select policy B 1116 when requests are received from proxy printing device B 1106. Private server 1002 does not want to apply policy A 1114, as it may not correspond to the reason why proxy printing device B was created.

Step 1414 executes by applying policy B 1116, as disclosed above with reference to FIGS. 1-9. The policy may determine whether the user can use printing device B2 to print document 1012. Instead of printing device B2, however, private server 1002 treats the request as if from proxy printing device B 1106. All requests from this proxy printing device will be subject to the conditions and parameters set forth in corresponding policy. Step 1416 executes by determining whether policy B 1116 allows the print job to proceed according to the parameters and rules of the policy. For example, private server 1002 may determine whether the user has met his/her limit for the printing period in that he/she cannot print any more pages using public server 1004.

If step 1416 is no, then step 1418 executes by sending an alert that the request is denied. The alert may be sent to printing device B2 via proxy printing device B 1116. Alternatively, printing device B2 may just not print and the user is not informed of the issue. Private server 1002 may send the response to proxy printing device B 1116, which then forwards it to the appropriate printing device. Data file 1128 may note a pending print job for document 1012 from printing device B2 and uses this record to make sure the information is provided correctly.

If step 1416 is yes, then step 1420 executes by generating response 1022 along with document 1012 for printing. Step 1422 executes by sending the data for document 1012 to public server 1004. As disclosed above, data file 1128 may be checked to determine which printing device requested document 1012. Step 1424 executes by sending the data for document 1012 to printing device B2. Step 1424 may include sending the data to proxy printing device B 1106. As the proxy printing device is not a real printing device, public server 1004 also may forward response 1022 directly to printing device B2. Step 1426 executes by updating ledger 1003 with any statistics generated from executing the print job at the printing device, such as updating the user's account with the pages printed or costs to print the pages.

Figure 15:
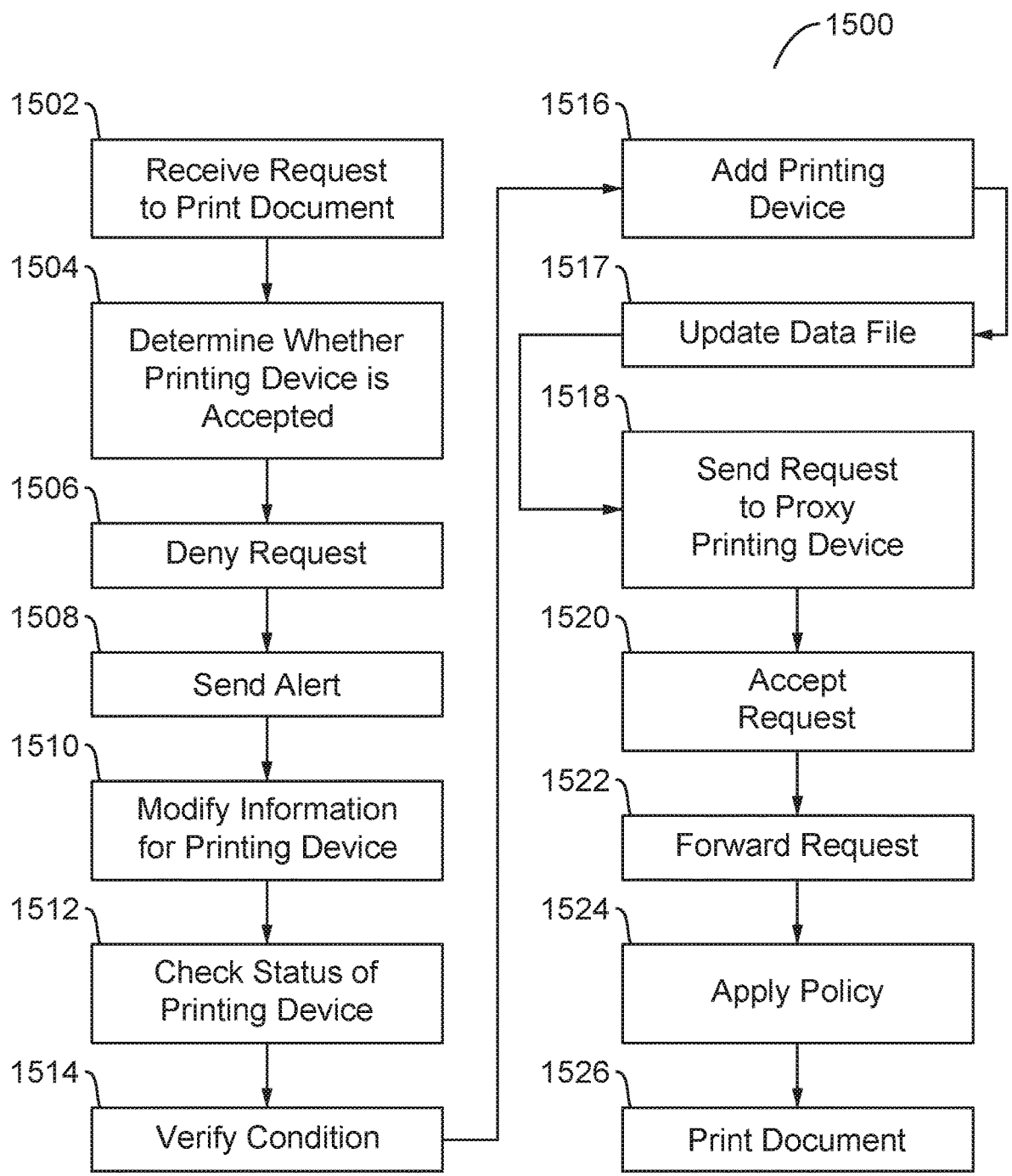
FIG. 15 illustrates a flowchart for managing a printing device using a proxy printing device according to the disclosed embodiments.

FIG. 15 depicts a flowchart 1500 for managing a printing device A1 using a proxy printing device B 1106 according to the disclosed embodiments. Flowchart 1500 may refer to FIGS. 1-14 for illustrative purposes. Flowchart 1400, however, is not limited by the features disclosed by FIGS. 1-14.

Step 1502 executes by receiving request 1016 to print document 1012 at printing device A1 at proxy printing device B 1106. Printing device A1 may not be in the set of printing devices managed by proxy printing device B 1106. Referring to FIG. 11, printing device A1 may send a request to proxy printing device B 1106 as opposed to proxy printing device A 1104. For example, the user of printing device A1 may seek to access document 1012 at private server 1002. Policy A 1114 may not apply to the user or to document 1012. Instead, policy B 1116 applies to the request. Thus, printing device A1 may forward the request for the print job to proxy printing device B 1106. Alternatively, proxy printing device A 1104 may not be available or within system 1000. Requests from printing device A1 for documents at private server 1002 are routed to another proxy printing device.

Step 1504 executes by determining whether request 1016 from printing device A1 is accepted by proxy printing device B 1106. Proxy printing device B 1106 may refer to data file 1128 to determine if printing device A1 is in the set of printing devices accessible by the proxy printing device. As printing device A1 does not include the condition used to create proxy printing device B 1106, it should not be listed in data file 1128. Moreover, proxy printing device B 1106 may check if printing device A1 includes the condition, such as being moved to a new location meeting the condition or to a new service provider that meets the condition for the company being managed by the proxy printing device.

Step 1506 executes by denying the request by proxy printing device B 1106 as printing device A1 does not include the condition or not listed in data file 1128. Proxy printing device B also may deny other requests from printing devices not within its set of printing device, such as printing devices B1, B2, and B3. Step 1508 executes by sending an alert to the user via printing device A1 or user device 1008. Proxy printing device B 1106 also may send information about the denial to public server 1004. Administrator 1102 also may be alerted.

Step 1508 executes by modifying information for printing device A1. As disclosed above, a printing device in system 1000 may include property information, which may be used in creating a proxy printing device. Printing device A1 may change its information as it is used. Printing devices may be moved or changed to different networks and service providers. Devices also may be removed due to age or lack of support. Using the example above, printing device A1 may be switched to the service provider corresponding to condition 1123, along with printing devices B1, B2, and B3.

Step 1514 executes by checking the status of printing device A1. Periodic checks may be made for changes in the statuses of the printing devices. Public server 1004 may request that the proxy printing devices in system 1000 verify that the managed printing devices are still available under the original conditions used to create the proxy printing devices. Alternatively, administrator 1102 may issue instructions to update the different sets of printing devices assigned to the proxy printing devices. In some embodiments, proxy printing devices may verify the printing devices assigned thereto when a request is received. A proxy printing device also may verify the statuses of its printing devices when a request is denied. Here, printing device A1 has its status checked to see if its information changed.

According to some embodiments, information for the printing devices may be updated at printing device table 1124 of database 1110. Thus, public server 1004 may check table 1124 for any updates to the conditions used to create the proxy printing devices. As the information for printing devices changes, updates are made to the information available in table 1124. Thus, the proxy printing devices are not having to constantly update their assigned printing devices. Further, when an update is made, database 1110 may alert public server 1004 that the listings for the proxy printing devices should be checked to see if the new information causes a printing device to be added or removed from an assignment to a proxy printing device.

Step 1514 executes by verifying that printing device A1 includes condition 1123. Public server 1004 may verify status of printing device A1 through proxy printing device B 1106. A query may be made directly to printing device A1 that it now includes condition 1123. Printing device A1 may respond verifying its changed condition. Step 1516 executes by adding printing device A1 to the set of printing devices assigned to proxy printing device B 1106. Public server 1004 is informed of the change. Step 1517 executes by updating data file 1128 accordingly. From now on, proxy printing device B 1106 may treat printing device A1 as it does printing devices B1, B2, and B3.

Step 1518 executes by sending the request to proxy printing device B 1106 from printing device A1. The request may be the same sent earlier or a new request to print a document stored on private server 1002. Step 1520 executes by accepting the request at proxy printing device B 1106. It checks data file 1128 to determine that printing device A1 is now assigned to its set of printing devices. Step 1522 executes by forwarding the request from proxy printing device B 1106 to public server 1004. From here, flowchart 1500 may proceed as disclosed above by forwarding the request to private server 1002.

Step 1524 executes by applying the associated policy to determine whether the request to print the document is allowed, as disclosed above. For example, policy B 1116 may be applied to request 1016 to determine whether user of printing device A1 may print the document. These processes are disclosed above. If allowed then the document is sent to printing device A1 through public server 1004. Step 1526 executes by printing document 1012 at printing device A1. Ledger 1003 may be updated accordingly.

Flowchart 1500 discloses the instance of a printing device being added to the set of printing devices assigned to a proxy printing device. Flowchart 1500 also may disclose the instance where a printing device is removed from the assigned set. Referring back to step 1510, the property information of printing device B 1, for example, changes to remove condition 1123. During the subsequent updates, table 1124 indicates that the status of printing device B1 changed and it should not be assigned to proxy printing device B 1106. Data file 1128 may be updated to drop printing device B 1.

Thus, the disclosed embodiments may use a proxy printing device to manage a plurality of printing devices that may access a private server to print documents. A company does not want to manage 1000s of printers. The disclosed proxy printing device allows the management to be moved off the private server and to a public server without compromising the privacy of the policies on the private server. An administrator can manage printing devices based on common policies. The company cannot control public printing devices. A printing device is authenticated based on its condition as determined on the private side. The printing device does not need to be authenticated or verified before being managed by the proxy printing device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A system to manage a plurality of printing devices, the system comprising:
    a public server;
    a proxy device connected to the public server, wherein the proxy device is configured to submit a request for a document and receive a response from the public server;
    a first printing device of the plurality of printing devices, the first printing device having a condition corresponding to the proxy device;
    a second printing device of the plurality of printing devices, the second printing device not having the condition corresponding to the proxy device; and
    a private server connected to the public server and storing the document, wherein the private server applies a policy to the request to determine whether to forward the document to the public server,
    wherein the proxy device accepts the request if from the first printing device, and
    wherein the proxy device does not accept the request if from the second printing device.

2. The system of claim 1, further comprising a user device to submit instructions to the first printing device or the second printing device to generate the request for the document.

3. The system of claim 1, wherein the proxy printing device is configured to accept the request from the second printing device after the second printing device includes the condition.

4. The system of claim 1, wherein the policy corresponds to the condition of the proxy device.

5. The system of claim 1, further comprising a data file for a set of printing devices of the plurality of printing devices having the condition, including the first printing device, wherein the data for the set of printing devices is stored on the public server.

6. The system of claim 5, wherein the data file is updated to change the set of printing devices as each of the plurality of printing devices add or delete the condition.

7. The system of claim 6, further comprising a database of the plurality of printing devices accessible by the public server, wherein the public server uses the condition to identify the set of printing devices to generate the data file.

8. The system of claim 1, further comprising a firewall between the private server and the public server.

* * * * *